US006996058B2

(12) United States Patent
Foster et al.

(10) Patent No.: US 6,996,058 B2
(45) Date of Patent: Feb. 7, 2006

(54) METHOD AND SYSTEM FOR INTERSWITCH LOAD BALANCING IN A COMMUNICATIONS NETWORK

(75) Inventors: Michael S. Foster, Federal Way, WA (US); Michael A. Dorsett, Federal Way, WA (US)

(73) Assignee: The Boeing Company, Seattle, WA (US)

(*) Notice: Subject to any disclaimer, the term of this patent is extended or adjusted under 35 U.S.C. 154(b) by 958 days.

(21) Appl. No.: 10/039,404

(22) Filed: Oct. 26, 2001

(65) Prior Publication Data

US 2002/0159446 A1 Oct. 31, 2002

Related U.S. Application Data

(60) Provisional application No. 60/314,287, filed on Aug. 22, 2001, provisional application No. 60/314,158, filed on Aug. 21, 2001, provisional application No. 60/314,088, filed on Aug. 21, 2001, provisional application No. 60/287,120, filed on Apr. 27, 2001, provisional application No. 60/287,081, filed on Apr. 27, 2001, provisional application No. 60/287,075, filed on Apr. 27, 2001, provisional application No. 60/287,069, filed on Apr. 27, 2001, provisional application No. 60/286,922, filed on Apr. 27, 2001, provisional application No. 60/286,918, filed on Apr. 27, 2001.

(51) Int. Cl.
*H04L 12/28* (2006.01)

(52) U.S. Cl. ...................................... 370/228; 370/399

(58) Field of Classification Search ........ 370/216–229, 370/389, 395.42, 395.3, 399, 397, 409, 386, 370/419, 237, 238, 238.1; 709/240, 241, 709/103

See application file for complete search history.

(56) References Cited

U.S. PATENT DOCUMENTS

| | | | | |
|---|---|---|---|---|
| 5,327,552 A | | 7/1994 | Liew | |
| 5,412,653 A | * | 5/1995 | Hoppe et al. | 370/360 |
| 5,432,783 A | | 7/1995 | Ahmed et al. | |
| 5,440,547 A | | 8/1995 | Easki et al. | |
| 5,548,639 A | | 8/1996 | Ogura et al. | |

(Continued)

FOREIGN PATENT DOCUMENTS

EP 0880298 A2 11/1998

(Continued)

OTHER PUBLICATIONS

"FloodGate-1 Data Sheet, Enterprise Traffic Management," Checkpoint Software Technologies Ltd., http://www.checkpoint.com, Jan. 1998 (8 pages).

(Continued)

*Primary Examiner*—Brenda Pham
(74) *Attorney, Agent, or Firm*—Perkins Coie LLP

(57) ABSTRACT

An interconnect fabric module ("IFM") with high-speed switching capabilities. An interconnect fabric module can be dynamically configured to interconnect its communications ports so that data can be transmitted through the interconnected ports. Multiple interconnect fabric modules can be connected to form an interconnect fabric through which nodes (e.g., computer systems) can be interconnected. In one embodiment, data is transmitted through the interconnect fabric as frames such as those defined by the Fiber Channel and InfiniBand standards. The interconnect fabric module allows the creation of an interconnect fabric that is especially well suited for interconnecting devices utilizing multiple information types such as might be required by the devices of an enterprise data network ("EDN").

19 Claims, 20 Drawing Sheets

U.S. PATENT DOCUMENTS

| | | | | | |
|---|---|---|---|---|---|
| 5,590,119 | A | * | 12/1996 | Moran et al. | 370/225 |
| 5,680,402 | A | | 10/1997 | Olnowich et al. | |
| 5,689,506 | A | | 11/1997 | Chiussi et al. | |
| 5,774,067 | A | | 6/1998 | Olnowich et al. | |
| 5,790,546 | A | | 8/1998 | Dobbins et al. | |
| 5,809,025 | A | | 9/1998 | Timbs | |
| 5,818,842 | A | | 10/1998 | Burwell et al. | |
| 5,872,783 | A | | 2/1999 | Chin | |
| 5,881,246 | A | | 3/1999 | Crawley et al. | |
| 5,892,766 | A | | 4/1999 | Wicki et al. | |
| 5,892,923 | A | | 4/1999 | Yasuda et al. | |
| 5,898,830 | A | | 4/1999 | Wesinger et al. | |
| 5,917,820 | A | | 6/1999 | Rekhter | |
| 5,940,596 | A | | 8/1999 | Rajan et al. | |
| 5,943,339 | A | | 8/1999 | Mauger | |
| 5,999,531 | A | | 12/1999 | Ferolito et al. | |
| 6,021,495 | A | | 2/2000 | Jain et al. | |
| 6,032,205 | A | | 2/2000 | Ogimoto et al. | |
| 6,034,956 | A | | 3/2000 | Olnowich et al. | |
| 6,041,049 | A | | 3/2000 | Brady | |
| 6,078,963 | A | | 6/2000 | Civanlar et al. | |
| 6,085,238 | A | | 7/2000 | Yuasa et al. | |
| 6,094,712 | A | | 7/2000 | Follett et al. | |
| 6,104,700 | A | | 8/2000 | Haddock et al. | |
| 6,108,708 | A | | 8/2000 | Iwata | |
| 6,147,976 | A | | 11/2000 | Shand et al. | |
| 6,195,335 | B1 | | 2/2001 | Calvignac et al. | |
| 6,215,412 | B1 | | 4/2001 | Franaszek et al. | |
| 6,216,173 | B1 | | 4/2001 | Jones et al. | |
| 6,219,706 | B1 | | 4/2001 | Fan et al. | |
| 6,262,976 | B1 | | 7/2001 | McNamara | |
| 6,278,714 | B1 | | 8/2001 | Gupta | |
| 6,292,488 | B1 | | 9/2001 | Filgate | |
| 6,292,839 | B1 | | 9/2001 | Naudus et al. | |
| 6,304,549 | B1 | | 10/2001 | Srinivasan et al. | |
| 6,381,242 | B1 | | 4/2002 | Maher, III et al. | |
| 6,385,197 | B1 | | 5/2002 | Sugihara | |
| 6,400,730 | B1 | | 6/2002 | Latif et al. | |
| 6,460,088 | B1 | * | 10/2002 | Merchant | 709/236 |
| 6,510,151 | B1 | | 1/2003 | Cioli et al. | |
| 6,535,518 | B1 | | 3/2003 | Hu et al. | |
| 6,608,819 | B1 | | 8/2003 | Mitchem et al. | |
| 6,614,758 | B2 | * | 9/2003 | Wong et al. | 370/232 |
| 6,650,646 | B1 | | 11/2003 | Zywicki et al. | |
| 6,707,800 | B1 | | 3/2004 | Peyrovian et al. | |
| 6,760,775 | B1 | | 7/2004 | Anerousis et al. | |
| 6,810,428 | B1 | | 10/2004 | Larsen et al. | |
| 6,917,614 | B1 | | 7/2005 | Laubach et al. | |
| 2002/0159389 | A1 | | 10/2002 | Foster et al. | |
| 2002/0159437 | A1 | | 10/2002 | Foster et al. | |
| 2002/0159451 | A1 | | 10/2002 | Foster et al. | |
| 2002/0159452 | A1 | | 10/2002 | Foster et al. | |
| 2002/0159453 | A1 | | 10/2002 | Foster et al. | |
| 2002/0159456 | A1 | | 10/2002 | Foster et al. | |
| 2002/0159458 | A1 | | 10/2002 | Foster et al. | |
| 2002/0159468 | A1 | | 10/2002 | Foster et al. | |
| 2002/0161887 | A1 | | 10/2002 | Foster et al. | |
| 2002/0161923 | A1 | | 10/2002 | Foster et al. | |
| 2002/0167902 | A1 | | 11/2002 | Foster et al. | |
| 2002/0184529 | A1 | | 12/2002 | Foster et al. | |
| 2002/0188754 | A1 | | 12/2002 | Foster et al. | |
| 2003/0189927 | A1 | | 10/2003 | Foster et al. | |
| 2003/0202535 | A1 | | 10/2003 | Foster et al. | |
| 2003/0202536 | A1 | | 10/2003 | Foster et al. | |
| 2003/0204618 | A1 | | 10/2003 | Foster et al. | |
| 2003/0210685 | A1 | | 11/2003 | Foster et al. | |
| 2004/0004966 | A1 | | 1/2004 | Foster et al. | |

FOREIGN PATENT DOCUMENTS

| | | | |
|---|---|---|---|
| WO | WO-02/088981 | A1 | 11/2002 |
| WO | WO-02/089418 | A1 | 11/2002 |

OTHER PUBLICATIONS

"Getting Started with FireWall-1, A Simple Configuration," Checkpoint Software Technologies Ltd., <http://www.messagenet.co.uk/products/manuals/firewall/tutorial.htm>, Jan. 1997 (7 pages).

InfiniBand, <<http://searchsmb.techtarget.com/gDefinition/0..sid44_gci>214596,00.html>, Jun. 5, 2001 (3 Pages).

Kohalmi, S., Anatomy of an IP Service Edge Switch: Accelerating Advance IP Services with a Pipelined Architecture, Quarry Technologies, Inc., Jan. 2001 (10 pages).

Meggyesi, Z., "Fiber Channel Overview," <http://hsi.web.cern.ch/HSI/fcs/spec/overview.htm> Research Institute for Particle and Nuclear Physics, Aug. 15, 1994 (10 Pages).

* cited by examiner

Deadlock 1610

| Time | Node 1605 | IFM 1601 | Node 1606 | IFM 1602 |
|---|---|---|---|---|
| 0 | Send start connect | | Send start connect | |
| 1 | | Connect 1↔0 | | Connect 2↔0 |
| 2 | | Forward start connect | | Forward start connect |
| 3 | | Can't forward start connect Node 1 | | Can't forward start connct |

METHOD AND SYSTEM FOR INTERSWITCH LOAD BALANCING IN A COMMUNICATIONS NETWORK

CROSS-REFERENCE TO RELATED APPLICATION(S)

This application claims the benefit of U.S. Provisional Application No. 60/287,069 entitled "METHOD FOR IMPLEMENTING A CLUSTER NETWORK FOR HIGH PERFORMANCE AND HIGH AVAILABILITY USING A FIBRE CHANNEL SWITCH FABRIC," filed Apr. 27, 2001; U.S. Provisional Application No. 60/287,120 entitled "MULTI-PROTOCOL NETWORK FOR ENTERPRISE DATA CENTERS," filed Apr. 27, 2001; U.S. Provisional Application No. 60/286,918 entitled "UNIFIED ENTERPRISE NETWORK SWITCH (UNEX) PRODUCT SPECIFICATION," filed Apr. 27, 2001; U.S. Provisional Application No. 60/286,922 entitled "QUALITY OF SERVICE EXAMPLE," filed Apr. 27, 2001; U.S. Provisional Application No. 60/287,081 entitled "COMMUNICATIONS MODEL," filed Apr. 27, 2001; U.S. Provisional Application No. 60/287,075 entitled "UNIFORM ENTERPRISE NETWORK SYSTEM," filed Apr. 27, 2001; U.S. Provisional Application No. 60/314,088 entitled "INTERCONNECT FABRIC MODULE," filed Aug. 21, 2001; U.S. Provisional Application No. 60/314,287 entitled "INTEGRATED ANALYSIS OF INCOMING DATA TRANSMISSIONS," filed Aug. 22, 2001; U.S. Provisional Application No. 60/314,158 entitled "USING VIRTUAL IDENTIFIERS TO ROUTE TRANSMITTED DATA THROUGH A NETWORK," filed Aug. 21, 2001, and is related to U.S. patent application Ser. No. 10/062,199 entitled "METHOD AND SYSTEM FOR VIRTUAL ADDRESSING IN A COMMUNICATIONS NETWORK," U.S. patent application Ser. No. 10/066,014 entitled "METHOD AND SYSTEM FOR LABEL TABLE CACHING IN A ROUTING DEVICE," U.S. patent application Ser. No. 10/039,505 entitled "METHOD AND SYSTEM FOR MULTIFRAME BUFFERING IN A ROUTING DEVICE," U.S. patent application Ser. No. 10/046,333 entitled "METHOD AND SYSTEM FOR DOMAIN ADDRESSING IN A COMMUNICATIONS NETWORK," U.S. patent application Ser. No. 10/039,404 entitled "METHOD AND SYSTEM FOR INTERSWITCH LOAD BALANCING IN A COMMUNICATIONS NETWORK," U.S. patent application Ser. No. 10/046,572 entitled "METHOD AND SYSTEM FOR INTERSWITCH DEADLOCK AVOIDANCE IN A COMMUNICATIONS NETWORK," U.S. patent application Ser. No. 10/039,877 entitled "METHOD AND SYSTEM FOR CONNECTION PREEMPTION IN A COMMUNICATIONS NETWORK," U.S. patent application Ser. No. 10/061,564 entitled "METHOD AND SYSTEM FOR MULTICASTING IN A ROUTING DEVICE," U.S. patent application Ser. No. 10/046,640 entitled "METHOD AND SYSTEM FOR NETWORK CONFIGURATION DISCOVERY IN A NETWORK MANAGER," U.S. patent application Ser. No. 10/046,334 entitled "METHOD AND SYSTEM FOR PATH BUILDING IN A COMMUNICATIONS NETWORK," U.S. patent application Ser. No. 10/039,703 entitled "METHOD AND SYSTEM FOR RESERVED ADDRESSING IN A COMMUNICATIONS NETWORK," U.S. patent application Ser. No. 10/039,814 entitled "METHOD AND SYSTEM FOR RECONFIGURING A PATH IN A COMMUNICATIONS NETWORK," U.S. patent application Ser. No. 10/066,217 entitled "METHOD AND SYSTEM FOR ADMINISTRATIVE PORTS IN A ROUTING DEVICE," U.S. patent application Ser. No. 10/039,784 entitled "PARALLEL ANALYSIS OF INCOMING DATA TRANSMISSIONS," U.S. patent application Ser. No. 10/066,159 entitled "INTEGRATED ANALYSIS OF INCOMING DATA TRANSMISSIONS," U.S. patent application Ser. No. 10/062,245 entitled "USING VIRTUAL IDENTIFIERS TO ROUTE TRANSMITTED DATA THROUGH A NETWORK," U.S. patent application Ser. No. 10/044,182 entitled "USING VIRTUAL IDENTIFIERS TO PROCESS RECEIVED DATA ROUTED THROUGH A NETWORK," U.S. patent application Ser. No. 10/044,164 entitled "METHOD AND SYSTEM FOR PERFORMING SECURITY VIA VIRTUAL ADDRESSING IN A COMMUNICATIONS NETWORK," and U.S. patent application Ser. No. 10/068,329 entitled "METHOD AND SYSTEM FOR PERFORMING SECURITY VIA DE-REGISTRATION IN A COMMUNICATIONS NETWORK", which are all hereby incorporated by reference in their entirety.

TECHNICAL FIELD

The described technology relates to network switches.

BACKGROUND

The Internet has emerged as a critical commerce and communications platform for businesses and consumers worldwide. The dramatic growth in the number of Internet users, coupled with the increased availability of powerful new tools and equipment that enable the development, processing, and distribution of data across the Internet have led to a proliferation of Internet-based applications. These applications include e-commerce, e-mail, electronic file transfers, and online interactive applications. As the number of users of, and uses for, the Internet increases so does the complexity and volume of Internet traffic. According to UUNet, Internet traffic doubles every 100 days. Because of this traffic and its business potential, a growing number of companies are building businesses around the Internet and developing mission-critical business applications to be provided by the Internet.

Existing enterprise data networks ("EDNs") that support e-commerce applications providing services to customers are straining under the demand to provide added performance and added services. The growing customer demands for services, along with a highly competitive market, has resulted in increasingly complex ad hoc EDNs. Affordable, high-performance EDN solutions require extensive scalability, very high availability, and ease of management. These attributes are significantly compromised or completely lost as existing solutions are grown to meet the demand.

Current architectures of EDNs typically include three sub-networks: 1) a local area network (LAN) for web and database servers, 2) a computational network for application servers, and 3) a storage area network (SAN). The processing and storage elements attached to these sub-networks may have access to a wide area network (WAN) or metropolitan area network (MAN) through a bridging device commonly known as an edge switch. Each of these sub-networks typically uses a distinct protocol and associated set of hardware and software including network interface adapters, network switches, network operating systems, and management applications. Communication through the EDN requires bridging between the sub-networks that requires active participation of server processing resources for protocol translation and interpretation.

There are many disadvantages to the current architecture of EDNs. The disadvantages result primarily because the multi-tiered architecture is fractured and complex. First, it is very difficult to integrate the disparate systems that use different communications protocols, interfaces, and so on. Second, overall performance suffers because each sub-network is managed separately, rather than being managed with comprehensive knowledge of the complete network. Third, the cost of maintaining three disparate types of network hardware and software can be high. Fourth, it is difficult to scale an architecture that uses such disparate systems. It would be desirable to have an architecture for EDNs that would be alleviate the many disadvantages of the current fractured multi-tiered architectures.

DETAILED DESCRIPTION

Figure 1:
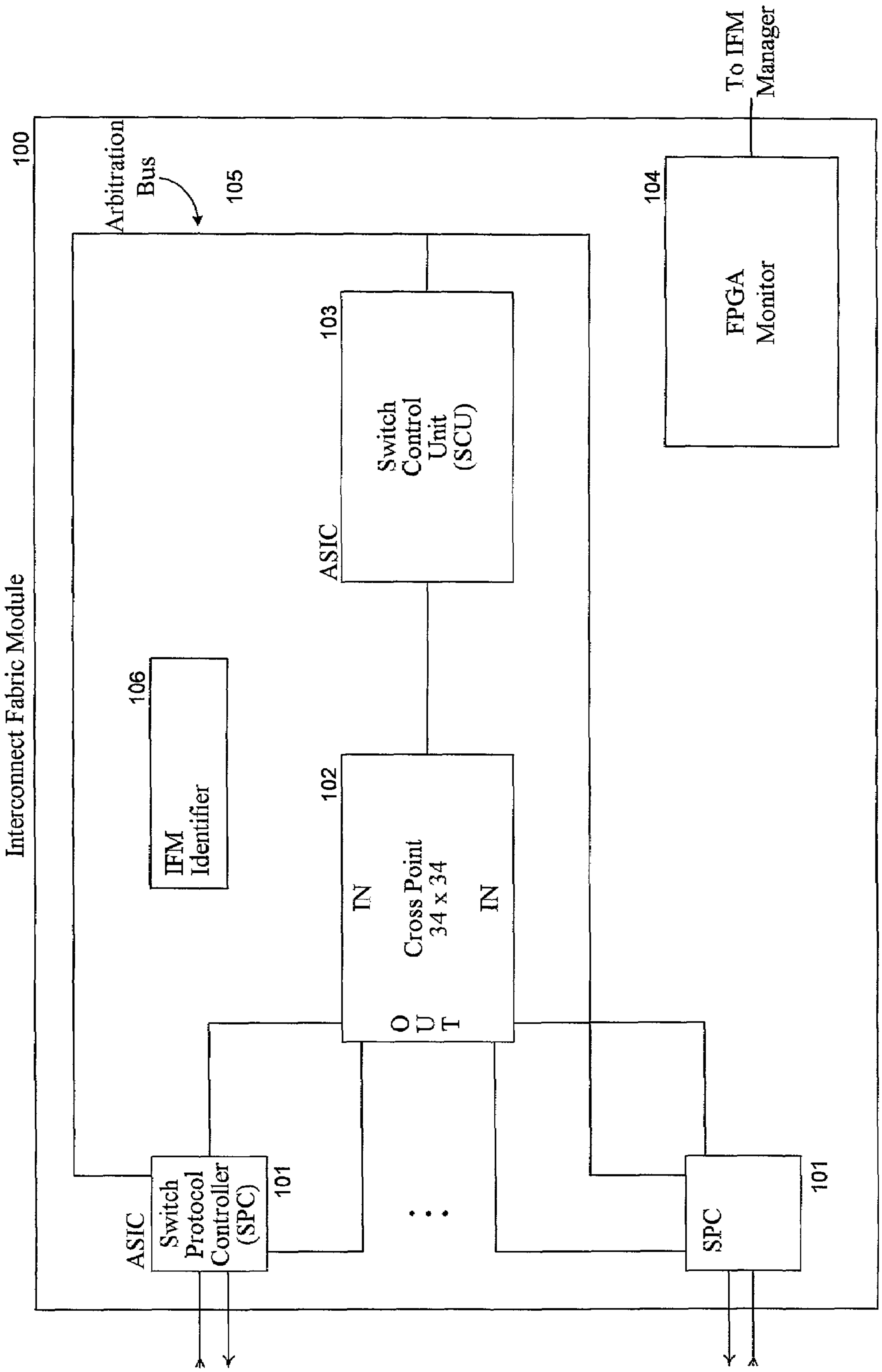
FIG. 1 is a block diagram illustrating components of the interconnect fabric module ("IFM") in one embodiment.

An interconnect fabric module ("IFM") with high-speed switching capabilities is provided. In one embodiment, an interconnect fabric module can be dynamically configured to interconnect its communications ports so that data can be transmitted through the interconnected ports. Multiple interconnect fabric modules can be connected to form an interconnect fabric through which nodes (e.g., computer systems) can be interconnected. In one embodiment, data is transmitted through the interconnect fabric as frames such as those defined by the Fibre Channel standard. Fibre Channel is defined in ANSI T11 FC-PH, FC-PH-2, FC-PH-3, FC-PI, and FC-FS industry standard documents which are hereby incorporated by reference. One skilled in the art will appreciate however, that the described techniques can be used with communications standards other than Fibre Channel. In particular, the described techniques can be used with the InfiniBand standard, which is described in the InfiniBand Architecture Specification, Vols. 1–2, Release 1.0, Oct. 24, 2000, which is hereby incorporated by reference. As will be described below in more detail, the interconnect fabric module allows the creation of an interconnect fabric that is especially well suited for interconnecting devices utilizing multiple information types such as might be required by the devices of an enterprise data network ("EDN").

The interconnect fabric modules use a virtual addressing technique to identify source and destination devices (e.g., another interconnect fabric module or a node). To send data from one node to another, initially the source node may register with a network manager of the interconnect fabric so that a communications path can be established between the source node and the destination node. The network manager selects source and destination virtual addresses to be used by the source and destination nodes when sending frames to each other. The network manager also identifies a path through the interconnect fabric modules and their ports through which frames will be sent between the nodes. The network manager then configures the interconnect fabric modules of the identified path so that when a frame is received at an interconnect fabric module that indicates the destination virtual addresses, that frame is forwarded to the destination nodes via the path. The network manager need only configure the interconnect fabric modules once for the path to be available to the nodes. The interconnect fabric modules may maintain a virtual address table for each of its ports that maps virtual addresses to its destinations ports. When a frame is received at a source port, the interconnect fabric module uses the virtual address of that frame and the virtual address table for the source port to identify a destination port through which the frame is to be forwarded. A virtual address, thus, identifies a path between devices, rather than identifying a source or a destination device. The use of virtual addresses allows the network manager the flexibility to dynamically change paths to meet the overall system needs. For example, if one interconnect fabric module on a path fails, the network manager may reconfigure the interconnect fabric modules to change a path to avoid the failed interconnect fabric module transparent to the source and destination nodes. Also, if multiple destination nodes provide the same functionality, then the network manager may implement node load balancing by changing a path so that data will be sent to a different destination node. The use of these virtual addresses allows the changes to be made without changing the source and destination virtual addresses of the path.

In one embodiment, a virtual address is part of a virtual identifier (e.g., stored as source or destination identifier in a frame) that includes a domain address. A destination identifier thus comprises a domain address and a virtual address. The destination identifiers of the frames received by the interconnect fabric modules are used to forward the frame. Each interconnect fabric module is assigned a domain address. The interconnect fabric modules that are assigned the same domain address are in the same domain. The interconnect fabric modules use of the domain addresses to forward packets between domains. The network manager may configure the interconnect fabric modules with inter-domain paths. When an interconnect fabric module receives a frame with a destination domain address that matches its domain address, then the frame has arrived at its destination domain. The interconnect fabric module then forwards the frame in accordance with the destination virtual address since it has arrived at its destination domain. If, however, the domain addresses do not match, then the frame has not arrived at its destination domain. The interconnect fabric module forwards the frame using an inter-domain path. Each port of an interconnect fabric module may have a domain address table (configured by the network manager) that maps the domain addresses to the destination port through which frames with that domain address are to be forwarded. Thus, an interconnect fabric module may selectively use virtual addresses and domain addresses when forwarding frames.

In one embodiment, an interconnect fabric module may implement virtual address tables (or domain address tables) using a caching mechanism. Each port of an interconnect fabric module may have its own cache of mappings from virtual addresses to destination ports. When a frame is received at a source port, the interconnect fabric module checks the cache of that source port to determine whether it has a mapping for the destination virtual address of that frame. If not, the interconnect fabric module checks a virtual address table that is shared by multiple ports. When the virtual address table has a mapping for the destination virtual address, then the interconnect fabric module forwards the frame in accordance with that mapping. The interconnect fabric module also stores that mapping in the cache for the source port so that that mapping can be retrieved more quickly when a subsequent frame is received at the source port with that destination virtual address. In an alternate embodiment, when the virtual address table does not have a mapping for the destination virtual address, the interconnect fabric module requests the network manager or an external virtual address table to provide the mapping. When that mapping is provided by the network manager or the external table, the interconnect fabric module stores it in the virtual address table. Thus, an interconnect fabric module may implement no caching, two-tiered caching, or three-tiered caching for virtual addresses (or domain addresses).

In one embodiment, an interconnect fabric module may implement multiframe buffering at each port so that frames can be buffered at source ports before being forwarded to a destination port as required. When a first frame is received at a source port, the interconnect fabric module stores that first frame in a first buffer of that source port. When a second frame is received at that source port, the interconnect fabric module stores that second frame in a second buffer of that source port. The interconnect fabric module may then identify a priority score for the first and second frames. The interconnect fabric module then transmits the frame with a higher priority score first. In this way, the interconnect fabric module provides both multiframe buffering for source ports and priority selection of the buffered frames.

In one embodiment, an interconnect fabric module may implement interswitch load balancing via groups of equivalent ports. As discussed above, interconnect fabric modules may themselves be interconnected to form a interconnect fabric for connecting nodes. Two interconnect fabric modules may have multiple links directly connecting their ports. Ports are considered equivalent when a frame can be selectively transmitted on any of the ports to reach its final destination. The use of multiple links (and equivalent ports) between interconnect fabric modules allows for a greater bandwidth between those interconnect fabric modules. The network manager may configure each interconnect fabric module to indicate which groups of its ports are equivalent. The interconnect fabric module may have an equivalent ports table that maps each port to its equivalent ports. When the interconnect fabric module receives a frame, it identifies a destination port based on the virtual address (or domain address) in the frame. If the identified destination port is currently in use, then the interconnect fabric module checks the equivalent ports table to determine whether there any equivalent ports. If so, and the equivalent port is not in use, the interconnect fabric module forwards the frame through the equivalent port. In this way, interconnect fabric modules can balance their load through the use of equivalent ports.

In one embodiment, an interconnect fabric module uses a crosspoint switch to switch connect its source and destination ports. When the crosspoint switch has more switch ports than ports of the interconnect fabric module, the extra switch port can be used for administrative functions of the network manager. When an interconnect fabric module receives a frame directed to a virtual address reserved for administrative services of the network manager, the interconnect fabric module connects the source port to the extra switch port which is connected to the network manager. When the frame is transmitted from the source port, the network manager receives the frame and processes it in accordance with its administrative functions. In this way, administrative frames can be directly forwarded to the network manager when they are first received by an interconnect fabric module from a node.

In one embodiment, a connection can be established from a source node to a destination node through multiple interconnect fabric modules. In certain circumstances, two directly linked interconnect fabric modules may encounter a deadlock when both are attempting to establish a connection using the same link. In such a situation, each interconnect fabric module already has a partially built connection through it and identifies that a request for a conflicting connection has been received. Each interconnect fabric module then determines which interconnect fabric module has the higher priority. If an interconnect fabric module determines that it does not have the higher priority, then it terminates its partially built connection and allows the conflicting connection with the higher priority to be built. The interconnect fabric module with the higher priority leaves its partially built connection and indicates that the conflicting connection cannot be established. By detecting potential deadlocks at the interconnect fabric module level, overall performance of the interconnect fabric is improved.

In one embodiment, an interconnect fabric module allows an existing connection between a source node and a destination node to be preempted by a request for a proposed connection that specifies a higher priority and specifies to preempt existing connections. When an interconnect fabric module receives a connection request at a source port, it identifies a destination port. If the destination port is currently part of an existing connection and the proposed connection indicates to preempt, then the interconnect fabric module determines whether the proposed connection or the existing connection has a higher priority. If the existing connection has a higher priority, then the interconnect fabric module indicates that the proposed connection cannot be made. If, however, the proposed connection has a higher priority, then the interconnect fabric module indicates that the existing connection is to be terminated and then proceeds to establish the proposed connection. The use of priorities to preempt an existing connection allows connection management to be distributed through the interconnect fabric, rather then performed directly by the network manager.

In one embodiment, a device may send a frame that is to be multicasted to multiple destinations without acknowledgment. The Fibre Channel communications standard refers to such a frame as a class 3 frames. Such frames are not guaranteed to be received by each destination. When an interconnect fabric module receives such a frame, it identifies its destination ports through which the frame is to be forwarded and forwards the frame to each identified destination port that is not currently in use. If an identified destination port is currently in use, the interconnect fabric module keeps the frame stored in the buffer until the identified destination port becomes available or until the time to live for the frame expires. When an identified destination port becomes available, the interconnect fabric module forwards the frame to that destination port. In this way, the interconnect fabric module increases the chances of the frame to being successfully received by all of its destinations.

In the following, aspects of the interconnect fabric module are described using block diagrams and logic diagrams. One skilled in the art will appreciate that the techniques of the interconnect fabric module can be implemented using different combinations logic circuits and/or firmware. In particular, the logic diagrams illustrate processing that may be performed in parallel using duplicate logic circuits (e.g., one for each line of a bus) or may be performed in serial using a single logic circuit. The particular logic designs can be tailored to meet the cost and performance objectives of the interconnect fabric module. One skilled in the art will be able to readily design logic circuits based on the following descriptions.

In one embodiment, many different techniques may be used by the network manager, the routing devices and the nodes to ensure the security of the network. In particular, the network manager may authenticate each node attempting to register to ensure that the node is not an imposter node. In this way, only previously authorized nodes can access the network. The routing devices may also discard any communication that is addressed with a virtual address that is not properly configured in the routing device. More generally, the routing device and nodes may check the header or other information of a communication to ensure that the communication is valid. If not valid, then the routing device or node can disregard the communication. For example, a routing device may detect that a communication received from a node specifies a higher priority than the priority authorized for the node by the network manager. In such a case, the routing device may discard the communication to prevent the node from using a priority that is higher than authorized. The routing device may also remove it configured virtual addresses to prevent use by nodes past an allotted time period or to prevent use by an imposter node. These security techniques can help ensure the overall security of the network and help prevent some all-to-common security problems, such as a denial-of-service attack. A denial-of-service attack can be prevented because an unauthorized node can only send communications through the routing device to which it is directly connected. The routing device can detect that the communication is unauthorized and immediately discard the communication without attaching the targeted node the network with communications sent from the unauthorized node. Moreover, since the routing device that is directly connected to the unauthorized node handles the security, the unauthorized communications do not impact the network bandwidth, except possibly for the bandwidth through the directly connected routing device.

In one embodiment, the network manager coordinates network security with the routing devices and the nodes. When a node registers with the network manager, the network manager authenticates the node. The network manager and the node may use a PKI-based ("Public Key Infrastructure") authentication technique. For example, a node may generate a private and public key pair. The node then provides its public key to the network manager during authorization that may be coordinated by a person who is a network administrator. Once authorized, the node can register with the network manager. To register, the node encrypts its registration request (or a portion of it) using its private key and then sends the encrypted registration request to the network manager. The network manager decrypts the registration request using the node's public key. If the request is correctly decrypted, then the network manager knows it was sent by an authorized node and proceeds with the registration. If, however, the request is not correctly decrypted, then the network manager knows that the request was sent by an imposter (or otherwise unauthorized) node and disregards the registration request. To ensure that a registration request is not intercepted and decrypted by an unauthorized node that has the authorized node's public key, the network manager may generate its own private and public key pair and provide its public key to the authorized node. An authorized node can then further encrypt the registration request with the network manager's public key. In this way, only the network manager can decrypt and recognize the registration request. One skilled in the art will appreciate that these encryption techniques can be use to protect any communication sent via the network and not just registration requests. In addition, various other authentication techniques may be used during registration of a node.

In one embodiment, a routing device filters communications sent from a directly connected node so that unauthorized communications are not transmitted through the network. The routing device may filter communications based on information contained in the header of the communication. In particular, a source-side port that receives a communication may discard the communication when the virtual address of the communication in not in the label table of the port. In addition, the network manger, when it configures a routing device at node registration, may configure the source-side port with filter parameters other than the virtual address. For example, the network manager may provide the source-side port with the maximum priority or the classes of service that the node is authorized to use. When the port receives a communication, it determines whether any of the filter parameters are unauthorized and, if so, discards the communication. The routing device may also notify the network manager of the unauthorized communication. Because the filtering is performed at the ports, unauthorized communications have minimal impact on overall network performance.

In one embodiment, the security of the network is further enhanced by the removal of virtual addresses from the routing device and from the nodes. When a virtual address is removed from a routing device or a node, then communications directed to that virtual address will no longer be accepted by the routing device or node. A virtual address may be removed for various reasons including when the network manager requests that it be removed, when a routing device or node detects a timeout for it, and when the routing device or node detects an error at the physical layer. The network manager may request that a virtual address be removed as part of a node's de-registration process. The de-registration may be initiated by the network manager or by the node itself. In either case, the network manager may send a request to remove the virtual address to each source-side port along the path from the source node to the destination node. The network manager may also send a request that the node itself remove its virtual address. When a routing device or node receives a virtual address, it may automatically remove the virtual address after a certain timeout period. The network manager may specify the timeout period, or the routing device or node may set its own timeout period. The routing device or node may restart the timeout period whenever a communication is received or sent using that virtual address, which results in removal based on when the virtual address was last used. The routing device or node may also remove a virtual address when certain events (e.g., errors) are detected at the physical layer. For example, the physical layer of a routing device may detect that the communications link between the routing device and a node has been removed (e.g., the line has been unplugged from the source-side port of the routing device). In such a case, the routing device may automatically remove all the virtual addresses associated with that node (e.g., stored in the label table of the source-side port). In this way, an imposter node cannot then be connected to the routing device and start sending communications using the virtual addresses of the disconnected node. In addition, since the routing devices are not configured until a node registers (i.e., just-in-time configuration), the length of time that the network is configured to support a node tends to be minimized and tends to be on an as-needed basis. The configuring of the network on an as-needed basis tends to reduce the opportunities an imposter node has to access the network and tends to free up network resource to be used by other authorized nodes.

FIG. 1 is a block diagram illustrating components of the interconnect fabric module ("IFM") in one embodiment. The interconnect fabric module 100 includes 32 switch protocol controllers ("SPC") 101, a crosspoint switch 102, a switch control unit ("SCU") 103, a field programmable gate array ("FPGA") monitor 104, an arbitration bus 105, and an IFM identifier 106. The interconnect fabric module has 32 bi-directional communication ports. A switch protocol controller controls each communications port. Each switch protocol controller is responsible for decoding the header information of a frame, arbitrating access to destination ports and configuring the crosspoint switch, and transmitting the received frame through the crosspoint connections to one or more communication ports. The switch control unit receives requests for crosspoint connections from the switch protocol controllers, configures the crosspoint switch accordingly, and directs the switch protocol controllers to transmit their frames through the crosspoint connections. The crosspoint switch provides full crossbar functionality in that each port of the interconnect fabric module can be simultaneously connected to any number of ports. In one embodiment, the crosspoint switch has 34 inputs and 34 outputs, numbered 0–33. The field programmable gate array monitor connects to an interconnect fabric module manager (not shown), which is a single board computer that may provide an interface for configuring the interconnect fabric module and may provide an interface to upper layer protocol services such as a name server or alias server.

Figure 2:
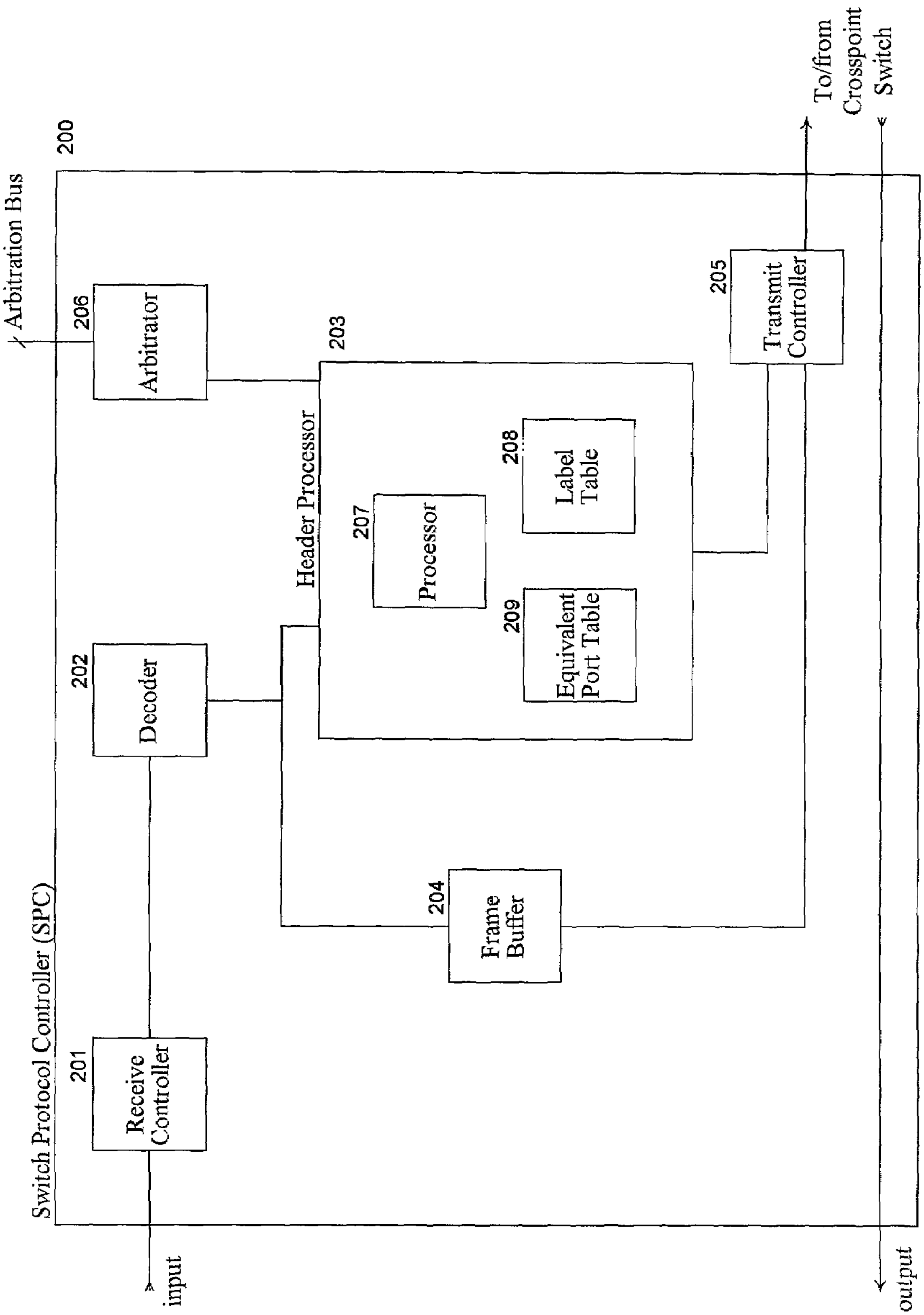
FIG. 2 is a block diagram illustrating components of a switch protocol controller in one embodiment.

FIG. 2 is a block diagram illustrating components of a switch protocol controller in one embodiment. The switch protocol controller 200 includes a receive controller 201, a decoder 202, a header processor 203, a frame buffer 204, a transmit controller 205, and an arbitrator 206. The receive controller is connected to the input (i.e., receive side) of a port and may perform a serial-to-parallel conversion of the received frame. The decoder provides the header information of the received frame to the header processor and stores the frame in the frame buffer. The header processor includes a processor 207, a label table 208, and an equivalent port table 209. The label table contains port maps that indicate to which ports a frame should be routed ("switch destination port") based on the port through which the frame is received (i.e., "switch source port") and the destination identifier of the frame. The processor retrieves the port map from the label table for the received frame and provides the port map to the arbitrator. The equivalent port table indicates groups of ports that are equivalent in the sense that a frame can be sent through any port of an equivalent group to reach the identified destination. If one port in an equivalent port group is currently in use, then a switch protocol controller can equivalently route the frame to any available port in the equivalent port group. The arbitrators of the switch protocol controllers coordinate access to the switch control unit so that a switch protocol controller can request the switch control unit to configure the crosspoint switch in accordance with the port map. As described below in detail, the arbitrators and the switch control unit are connected to an arbitration bus. The arbitrator is also connected to the output (i.e., transmit side) of the port for transmitting control frames. The transmit controller transmits frames stored in the frame buffer to the crosspoint switch when the switch control unit indicates that the crosspoint switch has been configured appropriately.

Figure 3:
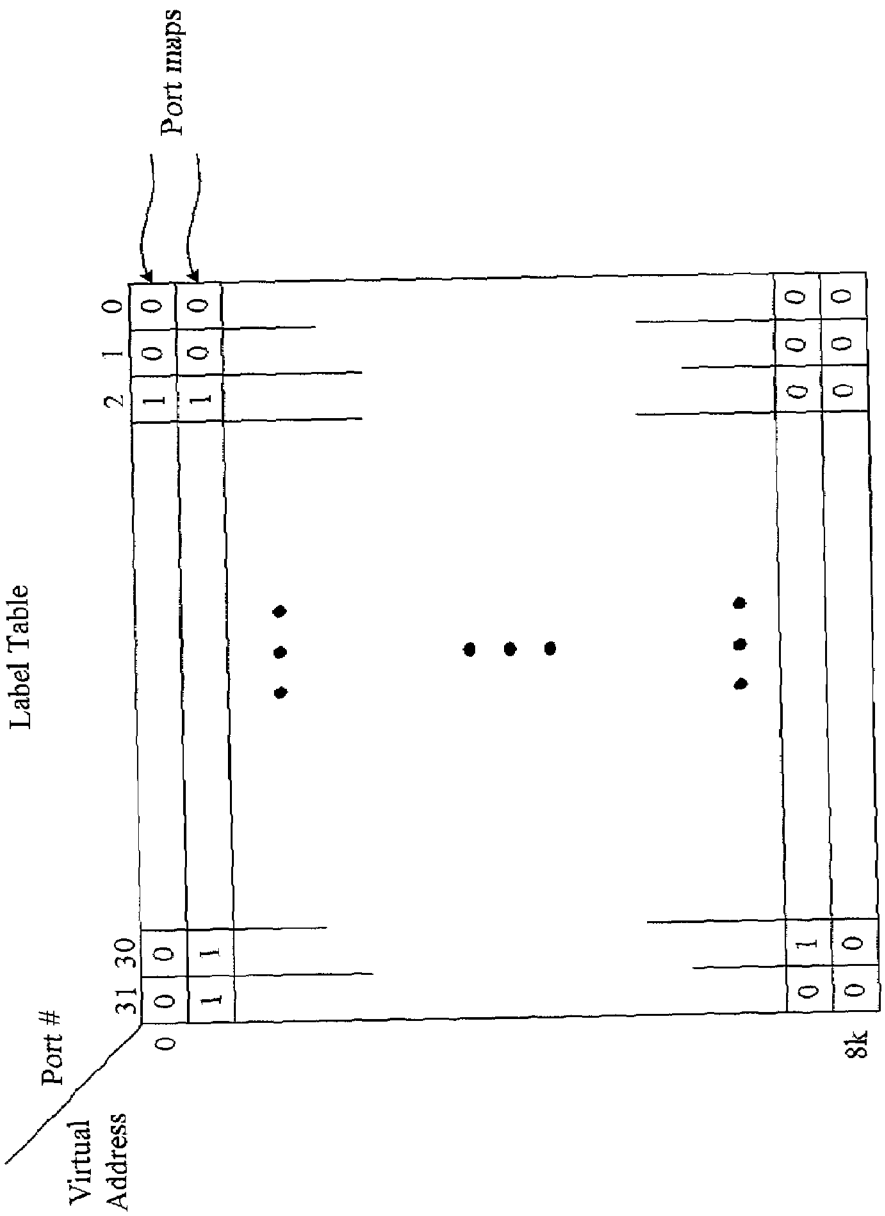
FIG. 3 is a block diagram illustrating the contents of a label table in one embodiment.

FIG. 3 is a block diagram illustrating the contents of a label table in one embodiment. The entries of the label table are port maps that are indexed by a virtual address. In one embodiment, the destination identifier includes a domain address and a virtual address, which are described below in detail. A virtual address is virtual in the sense that it is not a physical address of a node (or interconnect fabric module). Rather, a virtual address is mapped to a series of output ports of one or more interconnect fabric modules as specified by their label tables that define a route from the source device to the destination device. A port map has one bit for each of the 32 ports of the interconnect fabric module. A bit value of 1 indicates that frames directed to the indexing virtual address should be routed to the corresponding port. For example, the first entry in the label table contains a bit value of 1 in the column corresponding to port 2 and contains a bit value of 0 in all the other columns corresponding to ports 0, 1, and 3–31. When a frame is directed to the virtual address of 0, the corresponding entry in the label table indicates that the frame should be routed to only port 2. The second entry in the label table indicates that frames directed to the virtual address of 1 are to be routed to ports 2–31, but not to ports 0 and 1. In one embodiment, the label table of each switch protocol controller contains 8K entries. One skilled in the art will appreciate that the size of the label table can be adjusted to meet overall performance goals of the interconnect fabric module. Because each switch protocol controller has its own label table, a frame received via port 2 with a virtual address of 5 would be routed in accordance with the port map in the sixth entry of the label table for port 2.

Figure 4:
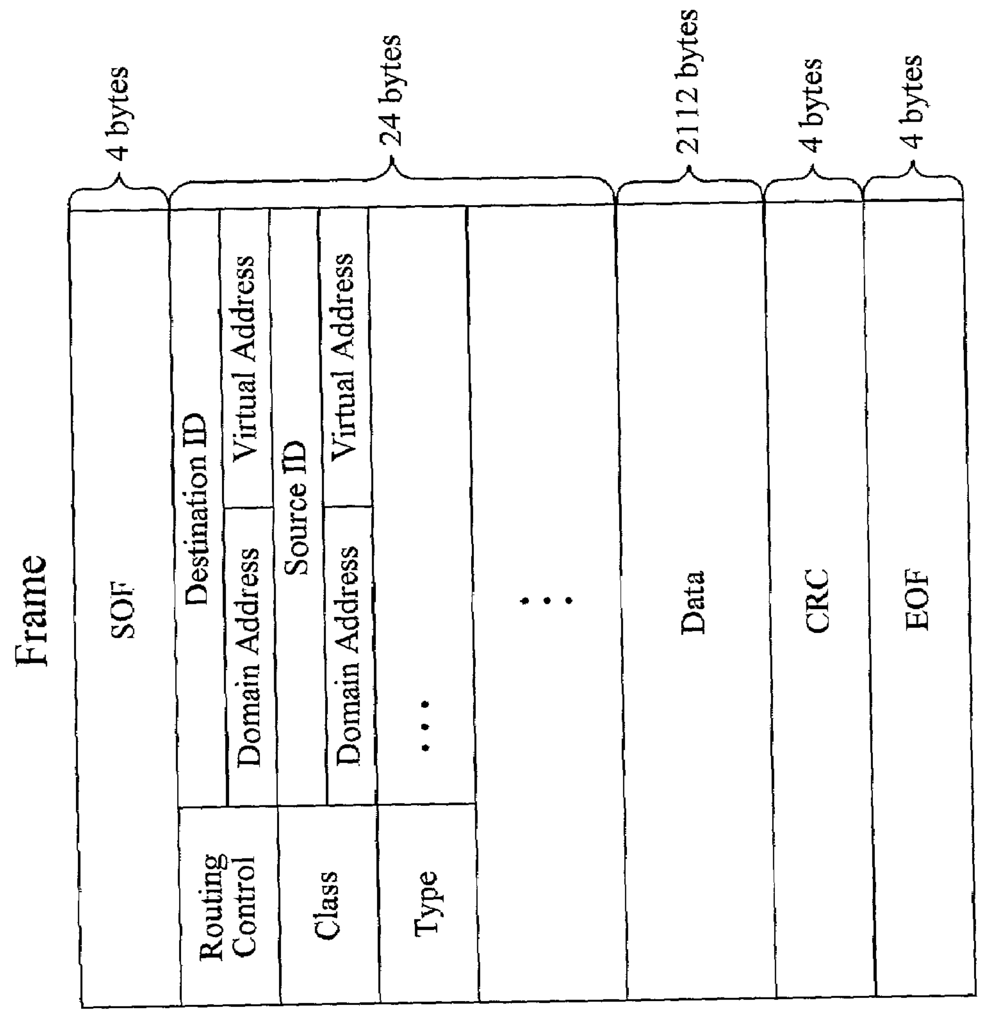
FIG. 4 is a block diagram illustrating the format of a frame in one embodiment.

FIG. 4 is a block diagram illustrating the format of a frame in one embodiment. The illustrated frame is in Fibre Channel format. One skilled in the art will appreciate that other formats can be used such as the InfiniBand format. A frame contains a start-of-frame portion, a header portion, a data portion, and an end-of-frame portion. The header portion includes a 24-bit destination identifier field, a 24-bit source address field, an 8-bit control field, an 8-bit type field, and an 8-bit priority field. The data portion is variable length and contains up to 2112 bytes. The destination and source identifiers include a domain address and a virtual address. The destination identifier identifies a path from a source device (e.g., node or switch) to one or more devices to which a frame is to be sent. The source identifier identifies a path from the destination device to the source device. The control field indicates whether the frame is a control frame or a data frame. A control frame may include response frames (e.g., an acknowledge frame), fabric control frames, flow control management frames, and link control frames. The flow control management and link control frames are standard Fibre Channel defined frames. The type field indicates the type of data in the data field. A data frame contains payload data that is to be sent from one node to another node using the interconnect fabric. The class of a frame specifies whether a frame is to be sent with or without a connection (e.g., Fibre Channel class 1 a connection with acknowledgment). The class field may indicate a class, a priority value, and a preemption flag. Start-of-connection and end-of-connection frames delimit a connection. A connection is a bi-directional, physical connection from a source node through the interconnect fabric to destination node. When the interconnect fabric receives a start-of-connection frame, the interconnect fabric modules cooperate to establish a physical connection between the source and destination nodes. The physical connection is maintained until an end-of-connection frame is sent via the connection or until a frame that has a priority higher than the connection and that designates to preempt conflicting connections (i.e., its preemptive flag is set) is received by an interconnect fabric module that needs to use one of its port that is dedicated to the existing connection.

Figure 5:
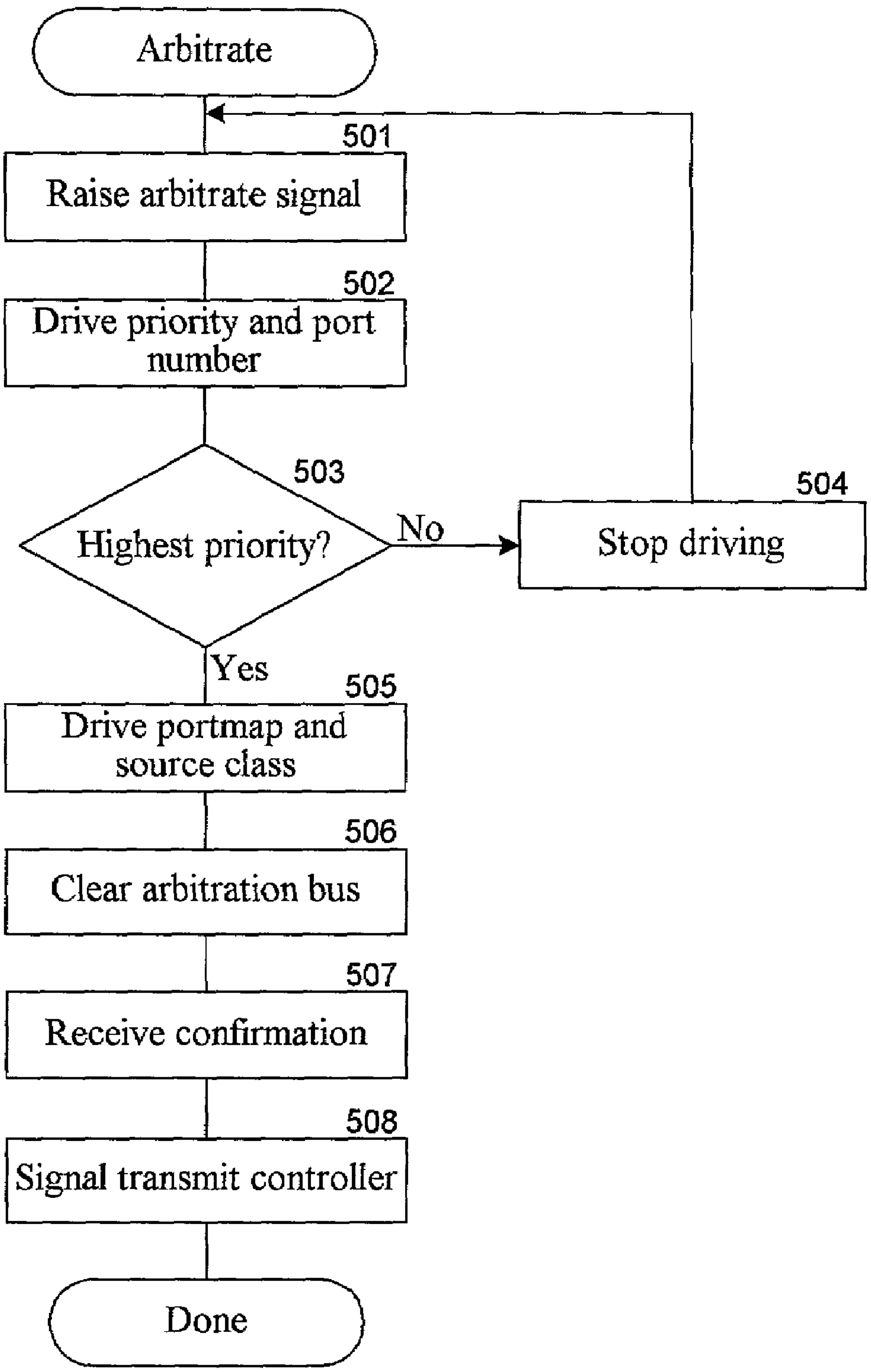
FIG. 5 is a diagram illustrating logic of an arbitrator of a switch protocol controller in one embodiment.

FIG. 5 is a diagram illustrating logic of an arbitrator of a switch protocol controller in one embodiment. The arbitrator communicates with the switch control unit via the arbitration bus. The arbitration bus follows the IEEE 896 Futurebus+ arbitration protocol. The arbitration bus is a wired-or bus in which multiple arbitrators can drive their information onto the bus simultaneously. Based on the information that is being driven on the arbitration bus, each arbitrator determines whether it is the arbitrator with the highest priority that is currently driving the bus. When an arbitrator decides that it does not have the highest priority, it stops driving its information onto the bus. Ultimately, the arbitrator with the highest priority will remain driving the bus. At that point the switch control unit retrieves the information from the arbitration bus, which includes the port map for the destination identifier, the switch source port number, and the class. The switch control unit then configures the crosspoint switch to crosspoint connect the input of the switch source port to the output of each switch destination port identified by the port map. The switch control unit then notifies the arbitrator with the highest priority that the crosspoint switch has been configured. In one embodiment, the arbitration bus includes 32 port status lines to indicate whether the corresponding port is currently in use. The switch control unit sets and clears the status lines as it configures the crosspoint switch. If the port status lines indicate that the crosspoint switch cannot be configured in accordance with the port map (e.g., a port indicated in the port map is in use), then the arbitrator, in general, does not participate in arbitrations until all the switch destination ports indicated by the port map become available. In block 501, the arbitrator raises an arbitration signal on the arbitration bus. If the arbitration signal is already raised, then the arbitrator waits until the arbitration signal is lowered before raising the signal. It is possible that two arbitrators can raise the arbitration signal simultaneously. If so, the arbitrator with the highest priority frame is given control of the arbitration bus. In block 502, the arbitrator drives a competition number comprising the 7-bit priority of the frame and the 5-bit port number of its port onto the arbitration bus. In decision block 503, if the arbitrator does not have the highest priority, then it stops driving the competition number and other data onto the arbitration bus in block 504 and then continues to block 501 so it can eventually raise the arbitration signal and try again. If the arbitrator has the highest priority and all the other arbitrators have stopped driving the arbitration bus, then the arbitrator continues at block 505. In block 505, the arbitrator drives the port map, its 5-bit port number, and class onto the arbitration bus. In block 506, the controller stops driving any data on the arbitration bus, and then lowers the arbitration signal. In block 507, the arbitrator receives confirmation from the switch control unit when the crosspoint switch has been appropriately configured. In block 508, the arbitrator signals the transmit controller to transmit the frame to the crosspoint switch and then completes. At that point, other arbitrators detect that the arbitration signal has been lowered and can then arbitrate access to the switch control unit.

Figure 6:
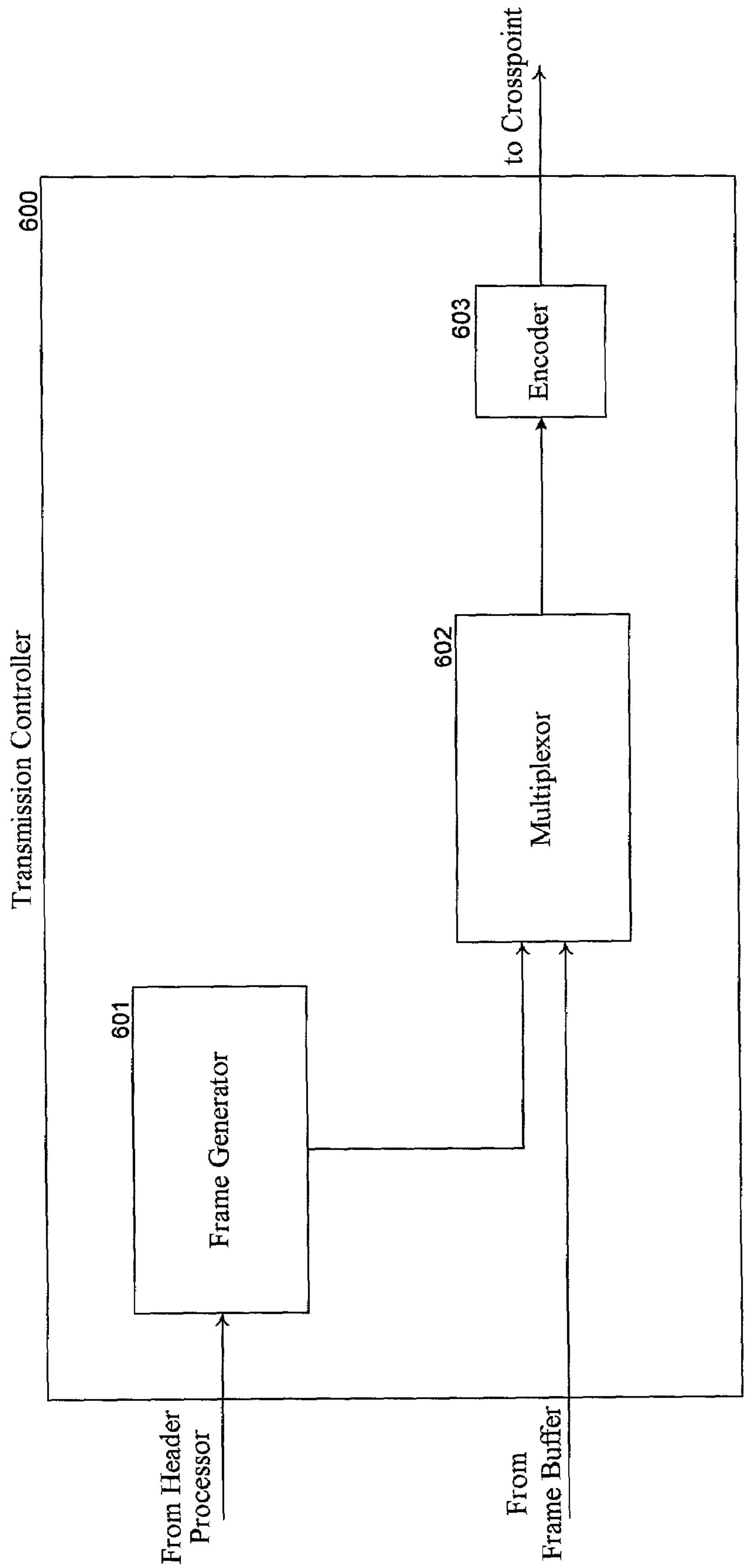
FIG. 6 is a block diagram illustrating the transmit controller in one embodiment.

FIG. 6 is a block diagram illustrating the transmit controller in one embodiment. The transmit controller 600 includes a frame generator 601, a multiplexor 602, and an encoder 603. The transmit controller when directed by the arbitrator either generates and transmits a control frame or transmits the frame currently stored in a frame buffer. The encoder forwards the frame to the crosspoint switch for transmission through the switch destination ports.

Figure 7:
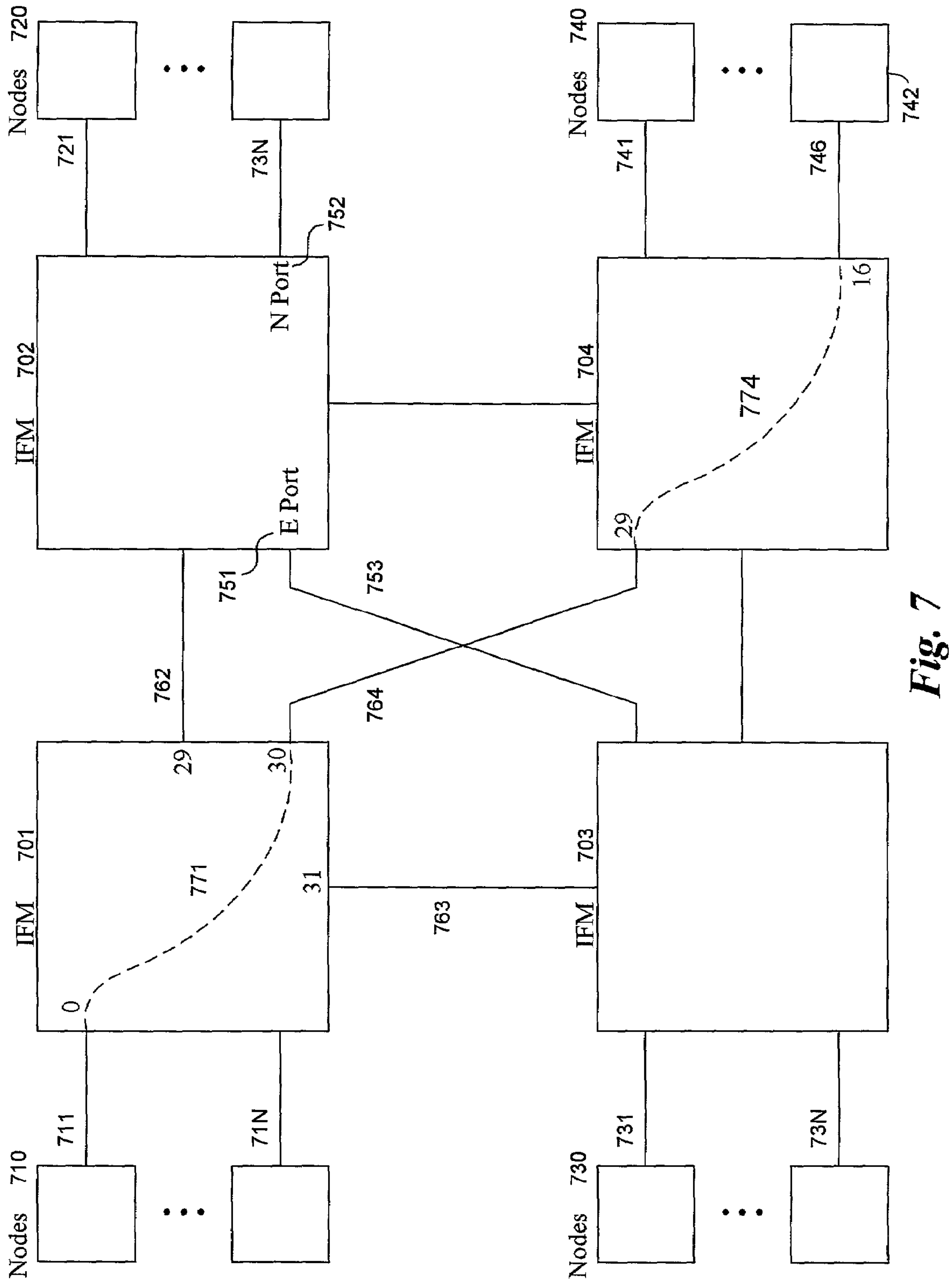
FIG. 7 is a block diagram illustrating the interconnection of interconnect fabric modules forming an interconnect fabric that connects various nodes.

FIG. 7 is a block diagram illustrating the interconnection of interconnect fabric modules forming an interconnect fabric that connects various nodes. In this example, the interconnect fabric modules 701, 702, 703, and 704 form a fully connected interconnect fabric. An interconnect fabric is fully connected when each interconnect fabric module is directly connected to each other interconnect fabric module. For example, interconnect fabric module 701 is directly connected to interconnect fabric module 702 via link 762, to interconnect fabric module 703 via link 763, and to interconnect fabric module 704 via link 764. Each interconnect fabric module is also directly connected to various nodes. For example, interconnect fabric module 701 is directly connected to nodes 710. The ports of a interconnect fabric module that are directly connected and other interconnect fabric modules are referred to as expansion ports ("E-ports"), and the ports of an interconnect fabric module that are connected to nodes are referred to as fabric ports ("F-ports"). FIG. 7 illustrates that a connection has been established between node 711 and node 746. Node 711 is directly connected to port 0 of interconnect fabric module 701. Port 0 of interconnect fabric module 701 is connected to port 30 via the crosspoint connection 771. Port 30 of interconnect fabric module 701 is directly connected to port 29 of interconnect fabric module 704 via link 764. Port 29 of interconnect fabric module 704 is connected to port 16 via the crosspoint connection 774. Port 16 of interconnect fabric module 704 is directly connected to node 746. While the connection is maintained, all frames sent from node 711 through port 0 of interconnect fabric module 701 are transmitted through the connection to node 746 via port 16 of interconnect fabric module 704. When a frame is transmitted using a connectionless protocol, the crosspoint switches of the interconnect fabric modules are dynamically configured to route the packet from the source node to the destination node. That is, once an interconnect fabric module transmits a frame from its switch source port through its switch destination port, those ports are available to be reconnected to other ports. Thus, with a connectionless protocol each frame will result in an arbitration at each interconnect fabric module in the path from the source node to the destination node.

Destination Identifier

Figure 8:
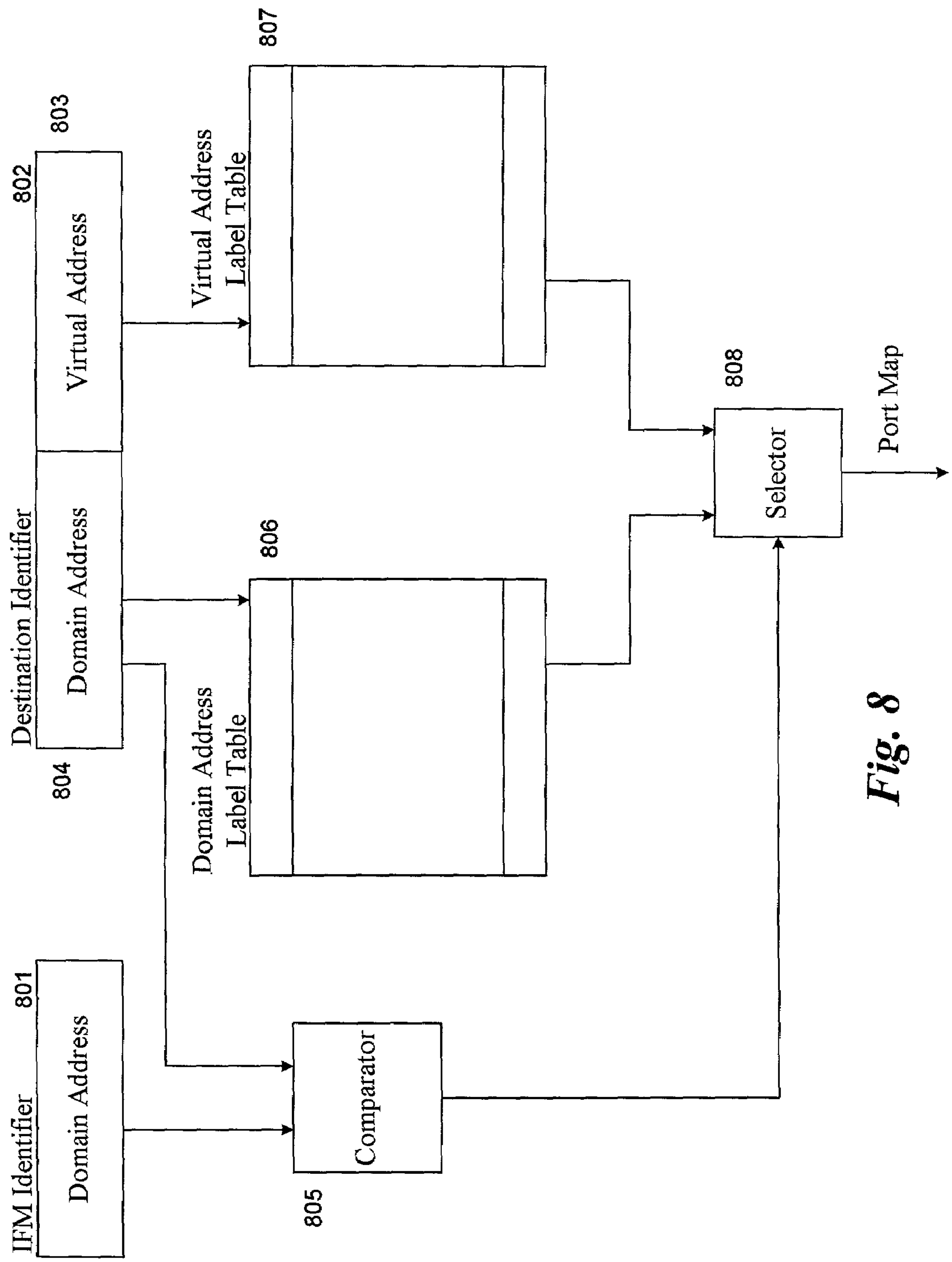
FIG. 8 is a block diagram illustrating the mapping of a destination identifier to a port map.

FIG. 8 is a block diagram illustrating the mapping of a destination identifier to a port map. Each interconnect fabric module has a interconnect fabric module identifier 801. In one embodiment, the interconnect fabric identifier contains a domain address that has been assigned to the interconnect fabric module. When a frame is processed by a switch protocol controller, the switch protocol controller determines whether the domain address of the destination identifier matches the domain address assigned to the interconnect fabric module. If so, then the switch protocol controller uses the virtual address label table to retrieve the port map. (The label table is sub-divided into a virtual address label table and a domain address label table.) If the domain addresses do not match, then the switch protocol controller uses a domain address label table to retrieve the port map. The domain address of a frame specifies those interconnect fabric modules that are configured to route the frame and the domain address label table is used to route frames to interconnect fabric modules that are configured to route the frame.

A switch protocol controller may include a destination identifier buffer 802, a comparator 805, a domain address label table 806, a virtual address label table 807, and a selector 808. The comparator inputs are the domain addresses of the interconnect fabric module and of the destination identifier. The comparator signals whether the domain addresses match. The domain address label table is indexed by the domain address of the destination identifier and outputs the indexed port map. The virtual address label table is indexed by the virtual address of the destination identifier and outputs the indexed port map. The port maps of the domain address label table and the virtual address label table are input to the selector, which selects a port map based on the input generated by the comparator. That is, the port map is selected from the virtual address label table when the domain addresses of the interconnect fabric module and of the destination identifier match and from the domain address label table when they do not match.

Label Table Caching

Figure 9:
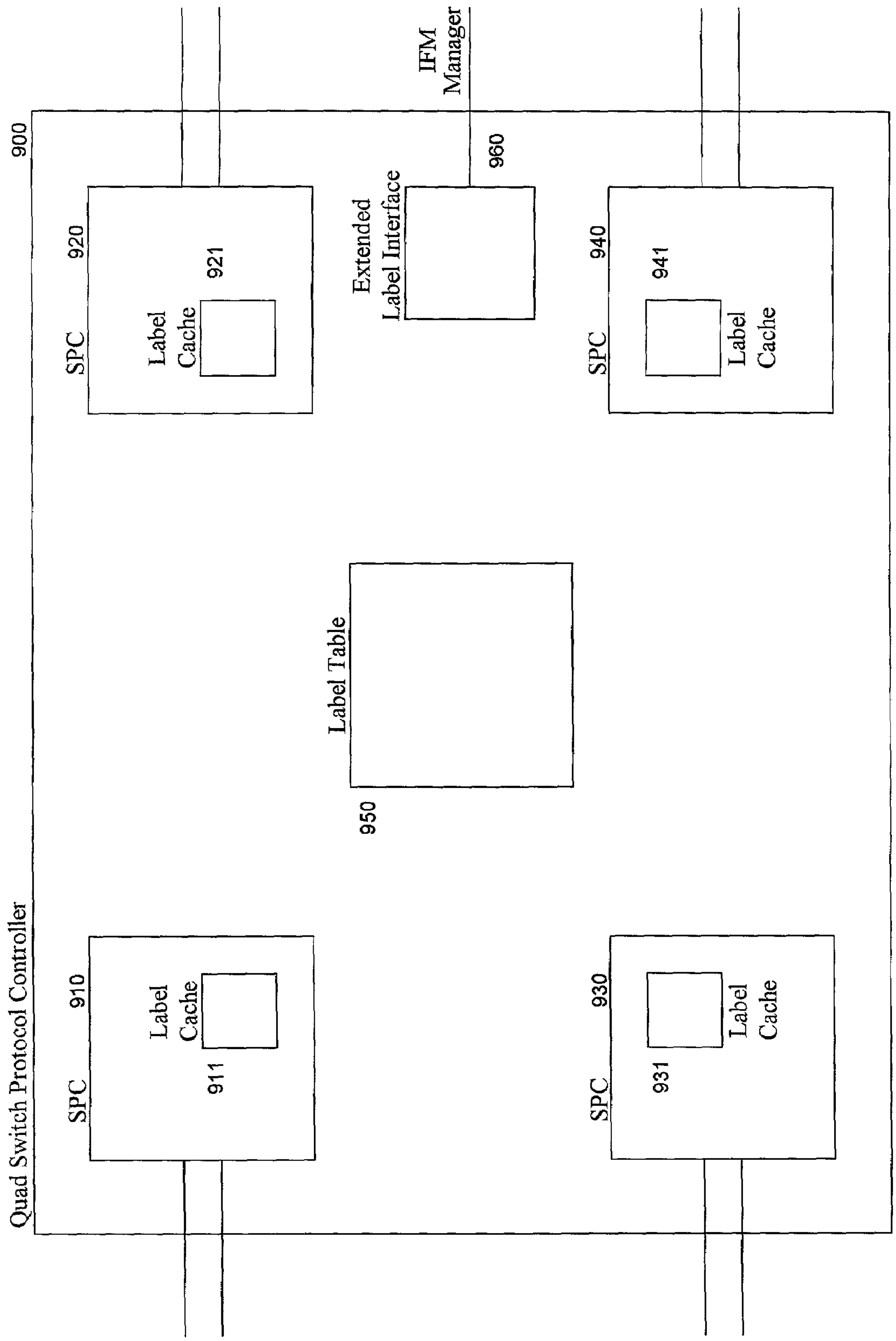
FIG. 9 is a block diagram illustrating switch protocol controller caching in one embodiment.

In one embodiment, multiple switch protocol controllers of an interconnect fabric module may share a single label table that may include both a virtual address label table and a domain address label table. The contents of the label table may be dynamically modified to reflect routing algorithms used by a manager of the interconnect fabric. Each switch protocol controller that shares a single label table may include a local label table cache in which it stores recently retrieved port maps from the shared label table. A switch protocol controller resolves an address (e.g., virtual address or domain address) into its corresponding port map, by first checking its local label table cache. If the port map corresponding to that address is not in the local label table cache, then the switch protocol controller accesses the shared label table. The use of local label tables and a shared label table represents a two-tier caching system. In one embodiment, the switch protocol controllers use a three-tier caching system. The third tier provides access to an extended label table that contains port maps not currently contained in the shared label table. Thus, when the shared label table does not contain the port map for an address, a switch protocol controller uses an extended label table interface to retrieve a port map for that address from a device that is external to the interconnect fabric module. FIG. 9 is a block diagram illustrating switch protocol controller caching in one embodiment. In this embodiment, four switch protocol controllers share a label table. The four switch protocol controllers may be contained on a single board or chip referred to as a quad switch protocol controller 900. Switch protocol controllers 910, 920, 930, and 940 share a single label table 950. Each switch protocol controller has a local label table cache such as local label table cache 911 for switch protocol controller 910. The extended label table interface 960 provides access to, in one embodiment, an interconnect fabric module manager that receives requests for port maps not currently stored in the shared label table and provides the requested port maps. Alternatively, the extended label table interface provides access directly to an external label table. The interconnect fabric module manager may access an overall manager of the interconnect fabric to retrieve the port maps. One skilled in the art will appreciate that various well-known caching techniques may be used to implement the two-tier or three-tier caching system of the switch protocol controllers.

Multiframe Buffering

In one embodiment, a switch protocol controller may implement multiframe buffering of the frames received through its input. Multiframe buffering allows a switch protocol controller to internally store multiple frames that have not yet been transmitted by the switch protocol controller. Multiframe buffering allows the device (e.g., node or interconnect fabric module) that sends a frame to the switch protocol controller to continue sending additional frames as long as a buffer is available at the switch protocol controller. In one embodiment, the devices may use the flow control mechanism of the Fibre Channel standard to coordinate the transmission of frames between devices. A switch protocol controller may implement a buffer arbitration algorithm to identify which of the frames in the multiframe buffer should be transmitted by the switch protocol controller. A buffer arbitrator of the switch protocol controller may use the priority and class of service of the frame to select the next frame to be transmitted. The buffer arbitrator may also factor in the latency of a frame (i.e., length of time the frame has been stored at the switch protocol controller). One skilled in the art would appreciate that many different types of buffer arbitration algorithms may be used, such as algorithms that attempt to ensure that each frame is transmitted before it times out or that use a first-in-first-out approach. Also, the buffer arbitration algorithm may be loaded at initialization or dynamically after initialization from the interconnect fabric module manager. In one embodiment, when a buffer arbitrator selects a start-of-connection frame, subsequent frames of that connection are automatically selected by the buffer arbitrator. This ensures that frames not associated with a connection are not transmitted via the connection.

Figure 10:
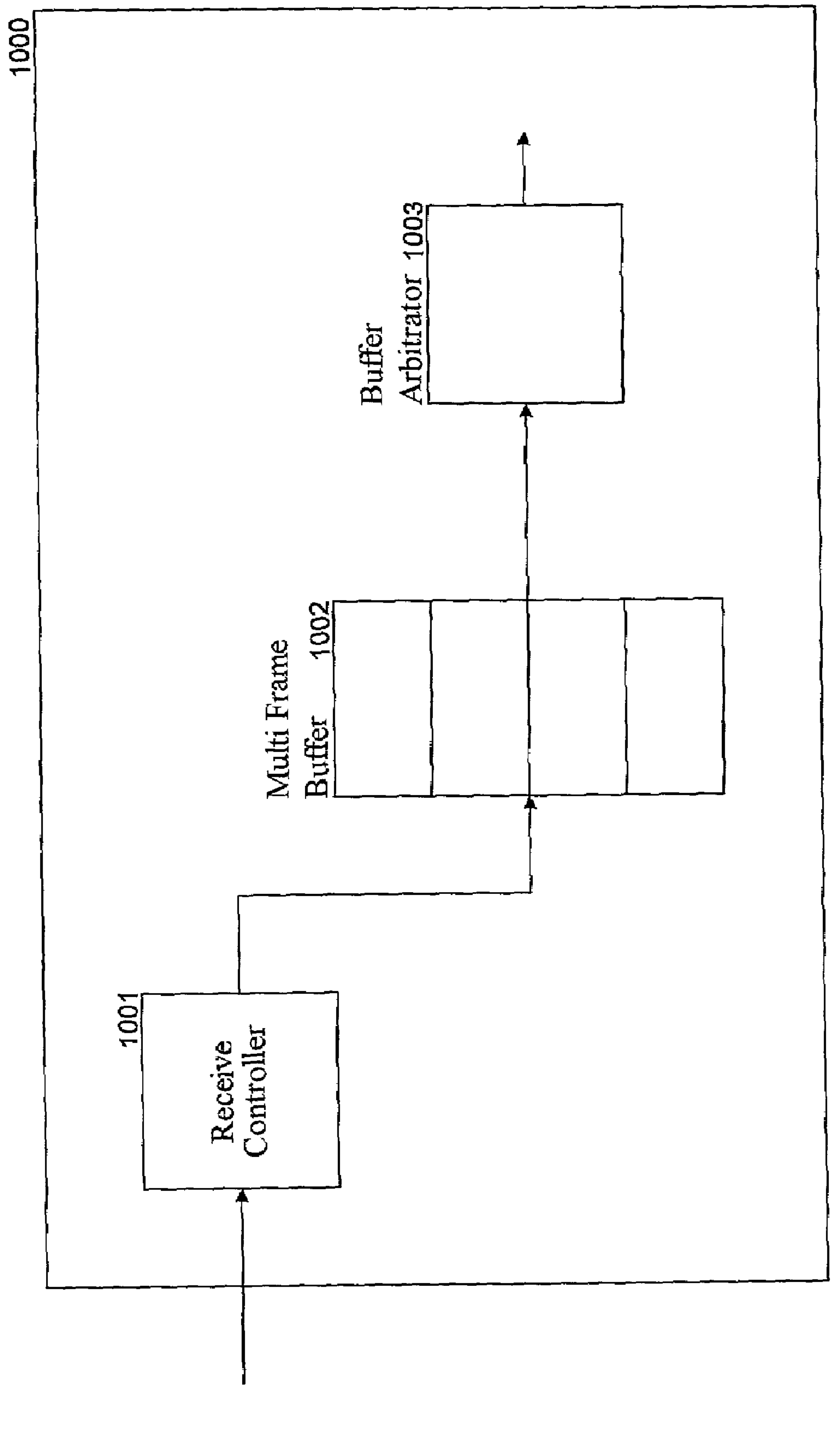
FIG. 10 is a block diagram illustrating multiframe buffering.
Figure 11:
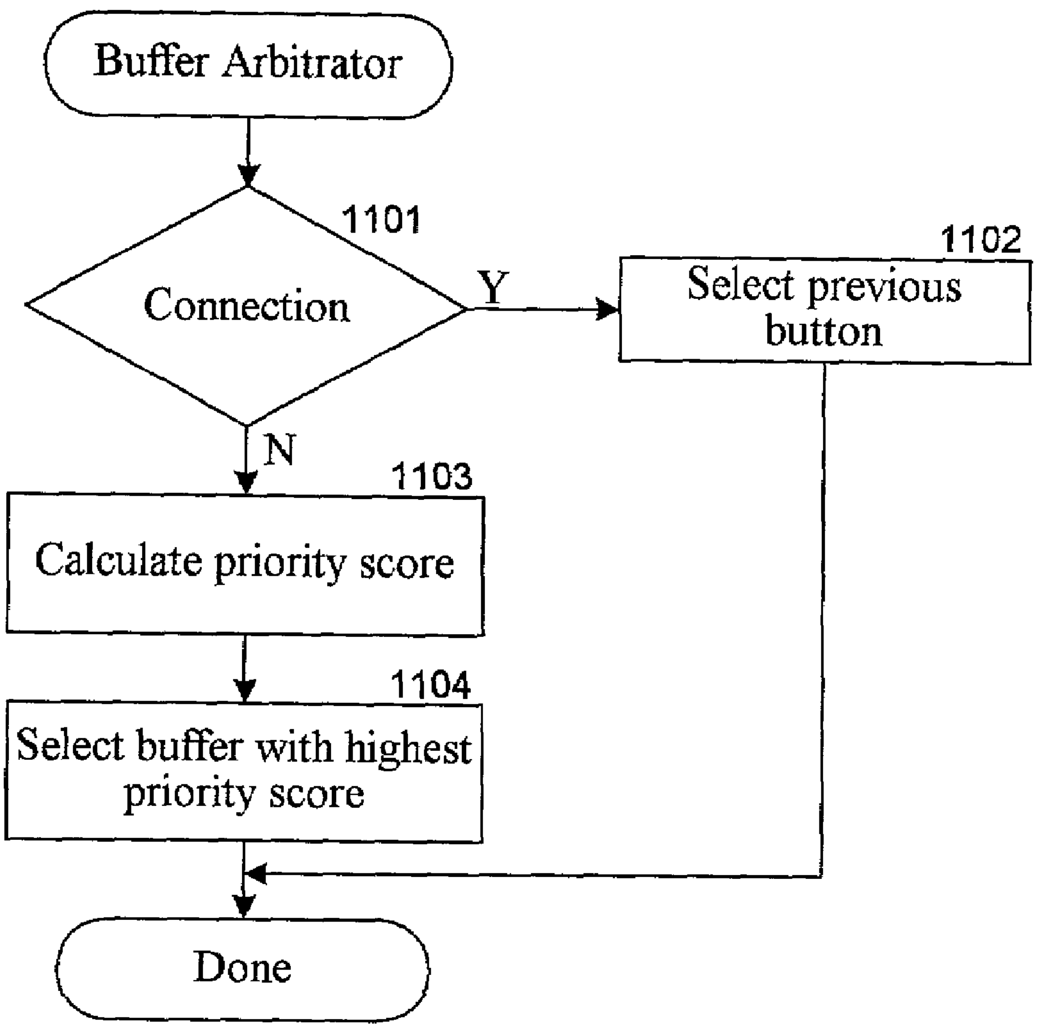
FIG. 11 is a diagram illustrating the logic of the buffer arbitrator in one embodiment.

FIG. 10 is a block diagram illustrating multiframe buffering. A switch protocol controller 1000 includes a receive controller 1001, a multiframe buffer 1002, and a buffer arbitrator 1003. The receive controller receives frames via the input of its port and stores the frame in the next available buffer of the multiframe buffer. In one embodiment, the receive controller may store all the frames of a connection in the same buffer. Alternatively, the received controller may store frames of a connection in different buffers and the buffer arbitrator ensures that frames of an established connection are given the highest priority. The buffer arbitrator is enabled when the switch protocol controller is ready to process the next frame. FIG. 11 is a diagram illustrating the logic of the buffer arbitrator in one embodiment. In decision block 1101, if the switch protocol controller is currently in a connection, then the buffer arbitrator selects the buffer associated with the connection and completes. If, however, the switch protocol controller is not currently in a connection, then the buffer arbitrator calculates a priority score for each frame stored in the multiframe buffer. The buffer arbitrator uses a buffer arbitration algorithm to calculate the priority score. In block 1104, the buffer arbitrator selects the buffer containing the frame with the highest priority score to be processed next and completes.

Interswitch Load Balancing via Groups of Equivalent Ports

Figure 12:
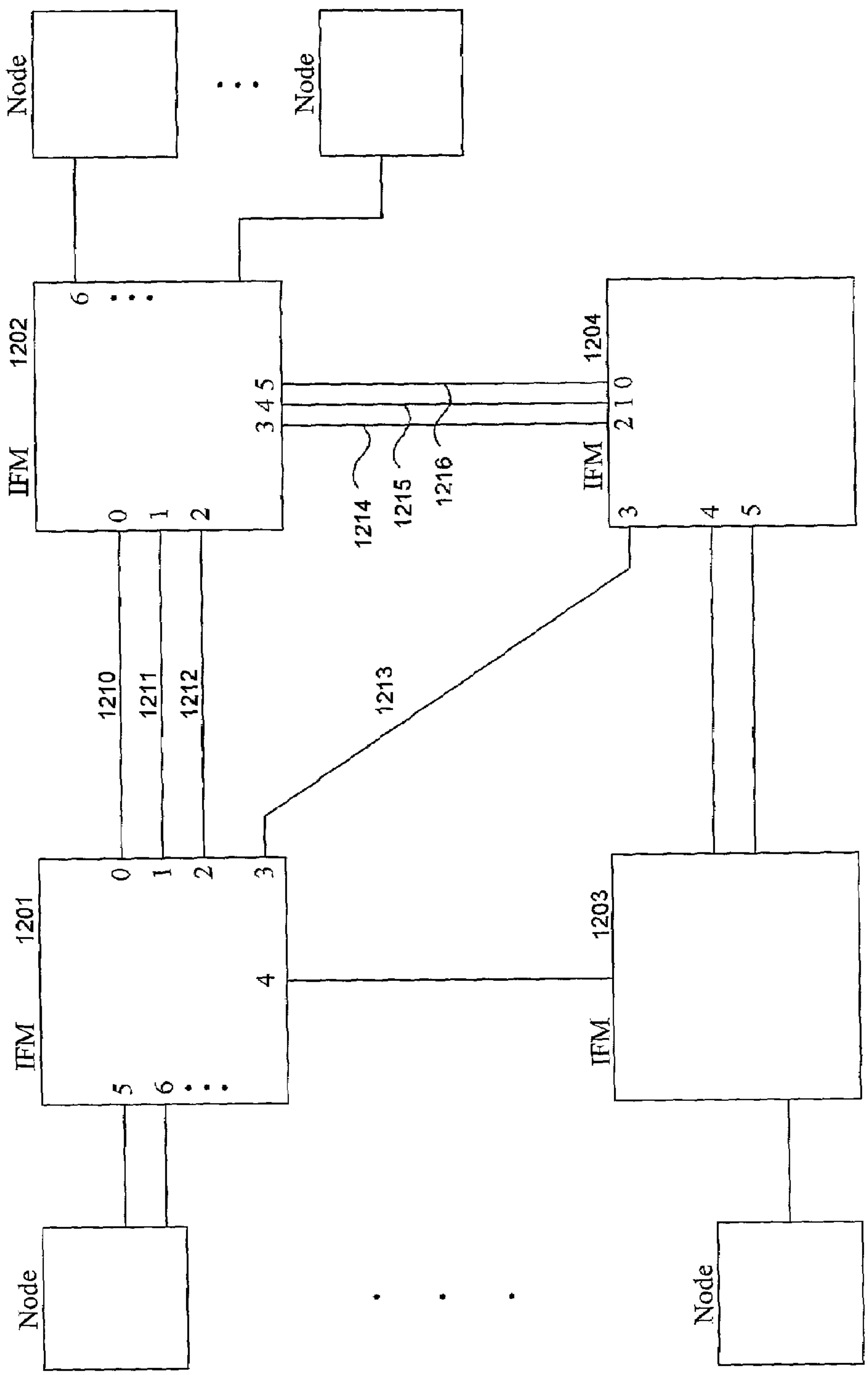
FIG. 12 is a block diagram illustrating an interconnect fabric configuration with multiple direct links between interconnect fabric modules.

The interconnect fabric modules may be interconnected to provide interswitch load balancing. For example, two interconnect fabric modules may have a multiple direct links between them to increase the bandwidth of frames that may be transmitted between the interconnect fabric modules. FIG. 12 is a block diagram illustrating an interconnect fabric configuration with multiple direct links between interconnect fabric modules. In this example, interconnect fabric module 1201 and interconnect fabric module 1202 have three direct links 1210, 1211, and 1212 between them. The use of multiple direct links allows multiple frames to be transmitted simultaneously between the directly linked interconnect fabric modules. For example, three nodes directly linked to interconnect fabric module 1201 may simultaneously have connections established to three different nodes directly linked to interconnect fabric module 1202. In this example, interconnect fabric module 1201 is also indirectly linked to interconnect fabric module 1202 via links 1213 and links 1214, 1215, and 1216 through interconnect fabric module 1204. Ports of an interconnect fabric module are equivalent when they can be use interchangeably to route frames to their destination. Equivalent ports may have similarly configured label tables.

In one embodiment, each switch protocol controller has an equivalent port table that defines which ports of the interconnect fabric module are logically equivalent to one another. (Alternatively, the switch protocol controllers of an interconnect fabric module may share an equivalent port table.) For example, ports 0, 1, and 2 may be equivalent ports for both interconnect fabric module 1201 and interconnect fabric module 1202. When the header processor selects a port map, an equivalent port service of the switch protocol controller determines whether the ports of the port map are currently available. If a port is not currently available, the equivalent port service determines from the equivalent port table whether an equivalent port is available. If so, the equivalent port service modifies the port map so that the frame is routed through the equivalent port. For example, if a port map designates port 0 of interconnect fabric module 1201, but port 0 is currently in use, then the equivalent port service may select port 1 as an equivalent to replace port 0 in the port map (assuming port 1 is not currently in use).

Figure 13:
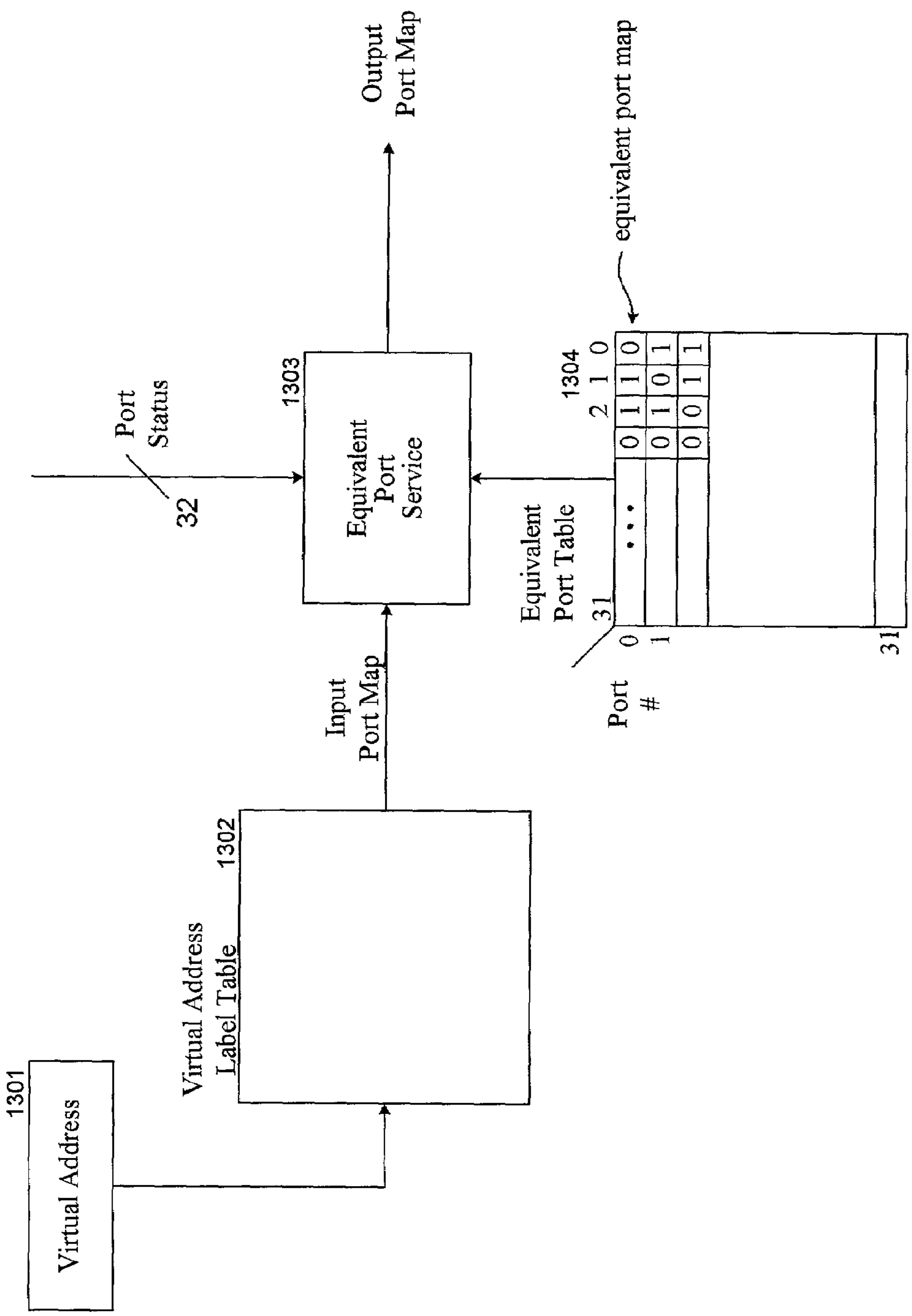
FIG. 13 is a block diagram illustrating the use of equivalent ports.

FIG. 13 is a block diagram illustrating the use of equivalent ports. Equivalent port service 1303 inputs a port map that may be generated using virtual address 1301 and virtual address label table 1302. Alternatively, the port map may be generated using a domain address and a domain address label table. The equivalent port service also inputs equivalent port table 1304. The equivalent port table contains an entry for each port of the interconnect fabric module. Each entry, referred to as an equivalent port map, contains a bit for each port of the interconnect fabric module. In this example, the entry for port 0 has its bits for port 1 and port 2 set to indicate that port 0, port 1, and port 2 are equivalent. The entry for port 1 has its bits for port 0 and port 2 set to indicate that port 0, port 1, and port 2 are equivalent. The equivalent port service also inputs the port status lines, which indicates the current status of each of the ports of the interconnect fabric module. When the equivalent port service receives a port map it determines whether the designated ports are available based on the port status. If a designated port is not available, the equivalent port service retrieves the equivalent port map for that designated port. The equivalent port service then determines whether any of the equivalent ports are available. If an equivalent port is available, then the equivalent port service changes the port map to designate an available equivalent port. If no equivalent ports are available, then the equivalent port service leaves the port map unchanged. In one embodiment, an equivalent port map may have a priority associated with each port. The equivalent port service may select equivalent ports based on their associated priority. The priorities may be useful, for example, when ports are equivalent, but the cost of routing a frame through the ports are different. For example, port 3 of interconnect fabric module 1201 may be equivalent to port 0, port 1, and port 2, but the cost of routing a frame through port 3 may be higher because the frame would travel through interconnect fabric module 1204 on its way to interconnect fabric module 1202.

Figure 14:
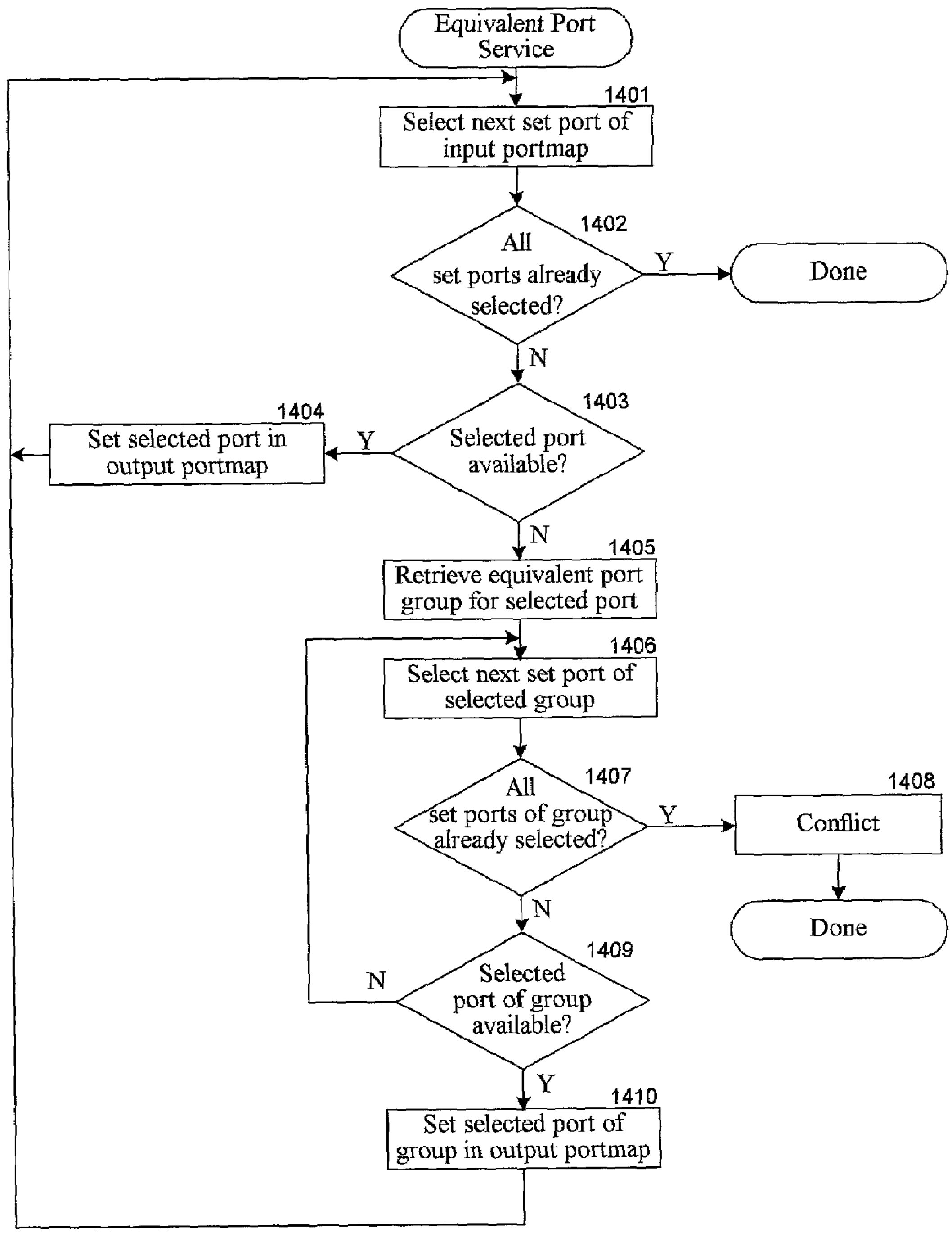
FIG. 14 is a diagram illustrating the logic of the equivalent port service in one embodiment.

FIG. 14 is a diagram illustrating the logic of the equivalent port service in one embodiment. The equivalent port service receives an input port map and processes each designated port of the input port map. The service may initialize the output port map so that no ports are designated. In block 1401, the service selects of the next designated port of the input port map. In decision block 1402, if all the designated ports have already been selected, then the service completes, else the service continues at block 1403. In decision block 1403, if the selected port is available, then the service designates the selected port in the output port map and proceeds to select the next designated port of the input port map. In block 1405, the service retrieves the equivalent port map for the selected port from the equivalent port table. In block 1406, the service selects the next designated port of the selected equivalent port map. In decision block 1407, if all designated ports of the equivalent port map have already been selected, then the service continues at block 1408, else the service continues at block 1409. In block 1408, the service designates the selected port in the output port map because no equivalent ports are available and completes. The service may repeat this process as ports become available. In decision block 1409, if the selected port of the equivalent port map is available, then the service continues at block 1410, else the service loops to block 1406 to select the next designated port of the equivalent port map. In block 1410, the service designates the selected port of the equivalent port map in the output port map and then loops to select the next designated port of the input port map.

Administrative Ports

In one embodiment, the crosspoint switch of a switch protocol controller may have more outputs than the number of ports of an interconnect fabric module. For example, a crosspoint switch may have 34 inputs and outputs, but the interconnect fabric module may have only 32 ports. The switch protocol controller may use these additional ports of the crosspoint switch to route upper layer protocol frames, such as frames directed into a name server or other administrative services. In one embodiment, the additional output ports of the crosspoint switch may be connected to the interconnect fabric module manager. An interconnect fabric module may have a list of "reserved" addresses that designate an upper layer protocol port. When a switch protocol controller determines that an address of its frame matches one of the reserved addresses, it enables the routing of that frame to an upper layer protocol port. The routing to upper layer protocol ports may use the same arbitration mechanism as used for routing to non-upper layer protocol ports. One skilled in the art will appreciate that the arbitration bus would need lines for supporting the additional ports. For example, six lines would be needed to designate ports 0 through ports 33, rather than the five lines needed to designate ports 0 through ports 31. Alternatively, when the crosspoint switch does not have extra output for an upper layer protocol port, an output can be selectively switched between a communications port and an upper layer protocol port depending on whether the address of the destination identifier is reserved.

Figure 15:
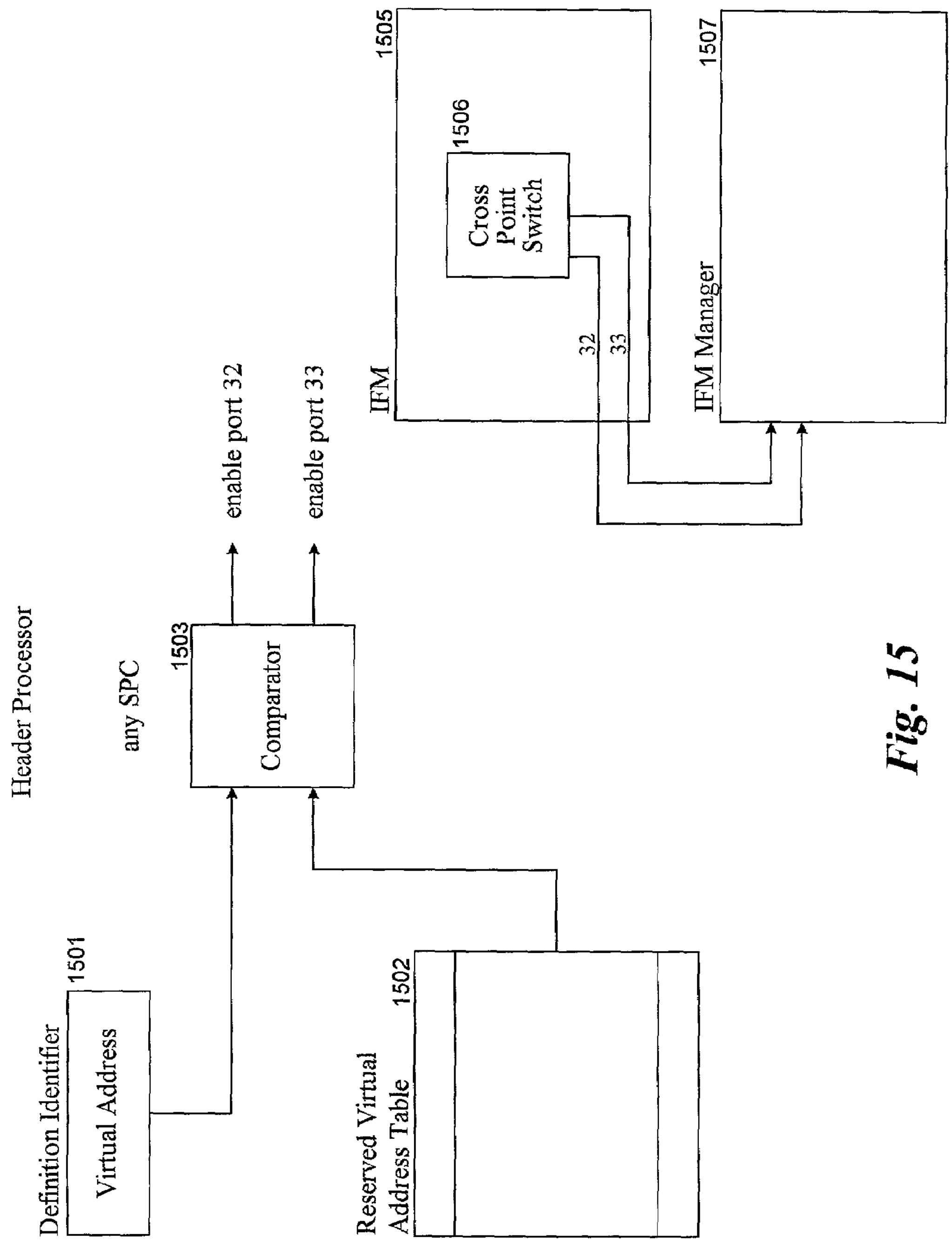
FIG. 15 is a block diagram illustrating a component for identifying upper layer protocol ports.

FIG. 15 is a block diagram illustrating a component for identifying upper layer protocol ports. This component may be part of the header processor of the switch protocol controller. An administrative port comparator 1503 inputs the virtual address of the destination identifier 1501 of a frame and a reserved address table 1502. The reserved address table has entry for each reserved address and contains the value of the reserved address and may contain a flag indicating whether to route a frame designating the reserved address to upper layer protocol port 32 or upper layer protocol port 33. When signaled, the comparator determines whether any of the reserved addresses match the virtual address of the frame. If so, the comparator enables the port 32 or port 33 flags. When enabled, the arbitrator automatically designates the signaled upper layer protocol port during arbitration. The crosspoint switch 1506 may be connected to the interconnect fabric module manager 1507 via upper layer protocol port 32 and upper layer protocol port 33. In this way, the upper layer protocol frames are routed to the interconnect fabric module manager as indicated for further processing.

Interswitch Deadlock Avoidance

Figure 16:
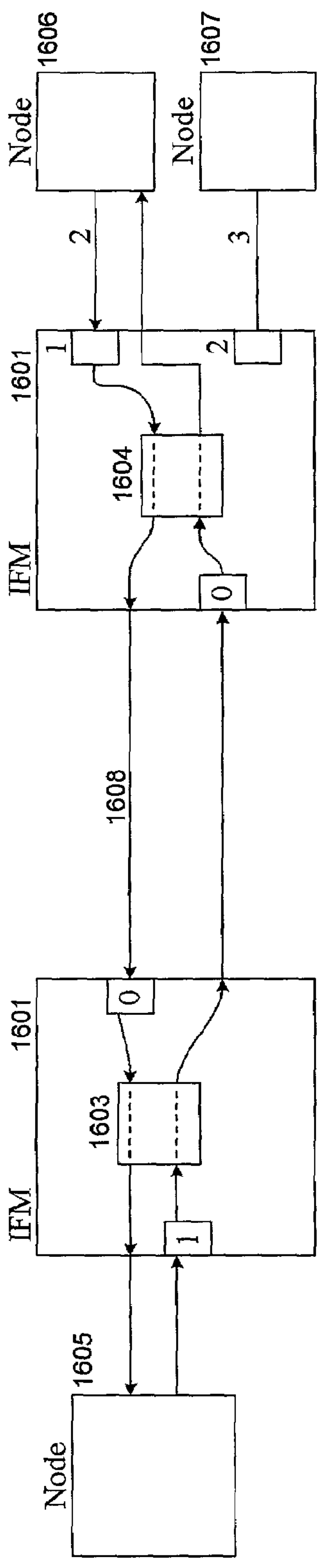
FIG. 16 is a block diagram illustrating an interswitch deadlock.

In one embodiment, the switch protocol controllers implement a deadlock avoidance scheme to prevent interswitch deadlocks. An interswitch deadlock may occur when two partially built connections both need the same port to complete their connections. FIG. 16 is a block diagram illustrating an interswitch deadlock. In this example, node 1605 requests that a connection be established to node 1607, and node 1606 requests that a connection be established to node 1605. Node 1605 is directly linked to port 1 of interconnect fabric module 1601 and nodes 1606 and 1607 are directly linked to ports 1 and 2, respectively, of interconnect fabric module 1602. Port 0 of interconnect fabric module 1601 is directly linked to port 0 of interconnect fabric module 1602. Table 1610 illustrates a sequence of events that results in a deadlock. At time 0, nodes 1605 and 1606 send out start-of-connection frames. At time 1, the interconnect fabric module 1601 establishes a crosspoint connection between its port 1 and its port 0 via crosspoint switch 1603 as part of the process of establishing the connection between node 1605 and node 1607. At the same time, interconnect fabric module 1602 establishes a crosspoint connection between its port 1 and port 0 via crosspoint switch 1604 as part of the process of establishing the connection between node 1606 and node 1605. At time 2, interconnect fabric module 1601 transmits the start-of-connection frame to interconnect fabric module 1602 via link 1608, and interconnect fabric module 1602 transmits the start-of-connection frame to interconnect fabric module 1601 via link 1608. When interconnect fabric module 1601 receives the start-of-connection frame, it determines that it cannot currently establish a crosspoint connection from port 0 to port 1 because port 0 is in use by the partial connection from node 1605 to node 1607. Similarly, when interconnect fabric module 1602 receives the start-of-connection frame, it determines that it cannot currently establish a crosspoint connection from port 0 to port 2 because port 0 is in use by the partial connection from node 1606 to node 1605. Because neither connection can be completed, a deadlock occurs. One skilled in the art will appreciate that deadlocks can result from a wide variety of sequences of events.

In one embodiment, a switch protocol controller uses an interswitch deadlock avoidance scheme. Whenever a switch protocol controller receives a start-of-connection frame and the switch protocol controller is currently in a connection, then a conflict has occurred. The switch protocol controller receives such a conflicting start-of-connection frame when the conflicting start-of-connection frame was initially transmitted from a node before the connection that included that switch protocol controller's port was complete. To avoid a deadlock, once the conflict is detected, the switch protocol controller compares the priority of the conflicting start-of-connection frame with the priority of the start-of-connection frame for its partially built connection to determine which connection should be established. If the frames have the same priority, then the switch protocol controller uses the domain address identifier or other unique identifier of the interconnect frame modules as a tiebreaker, that is the interconnect fabric module that received and the one that sent the conflicting start-of-message frame. If the priority of the conflicting frame is higher, then the switch protocol controller sends a frame through its input direction indicating that the connection cannot be established and then proceeds to process the conflicting start-of-connection frame to complete the connection. Conversely, the switch protocol controller that sent the conflicting frame also detects the conflict but determines that the frame it sent has a higher priority and ignores the start-of-connection frame that it just received.

Figure 17:
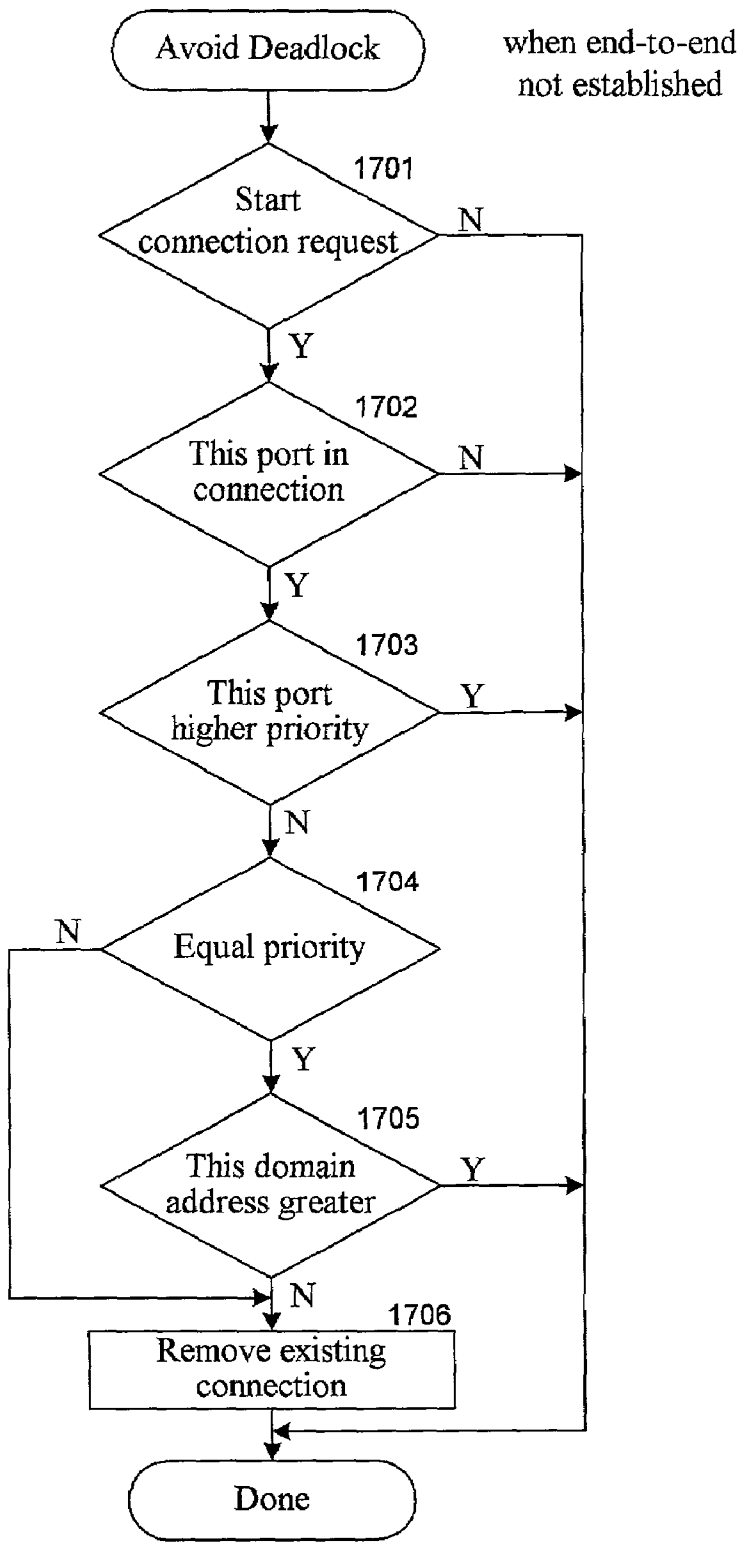
FIG. 17 is a diagram illustrating the logic of deadlock avoidance algorithm in one embodiment.

FIG. 17 is a diagram illustrating the logic of deadlock avoidance algorithm in one embodiment. The deadlock avoidance algorithm may process each frame that is received by a switch protocol controller. In decision block 1701, if a start-of-connection frame is received, then processing continues at block 1702, else there is no conflict. In decision block 1702, if the port is currently in a connection, then there is a conflict and the processing continues at block 1703, else there is no conflict. In decision block 1703, if the frame that established the connection for this port has a higher priority than the conflicting frame just received, then this port wins the conflict and discards the conflicting frame, else the processing continues at block 1704. In decision block 1704, if the priorities are equal, the processing continues at block 1705 to check the tiebreaker, else this switch protocol controller loses the conflict and continues at block 1706. In decision block 1705, if the domain address of this interconnect fabric module is greater than the domain address of the interconnect fabric module that sent the conflicting frame, then this port wins the conflict, else this port loses the conflict and continues at block 1706. In block 1706, when this port loses conflict, it removes the partial connection that has been established through it by sending a remove connection frame through its input to notify the originating node and the other interconnect fabric modules through which the connection was partially built.

Connection Preemption

Figure 18:
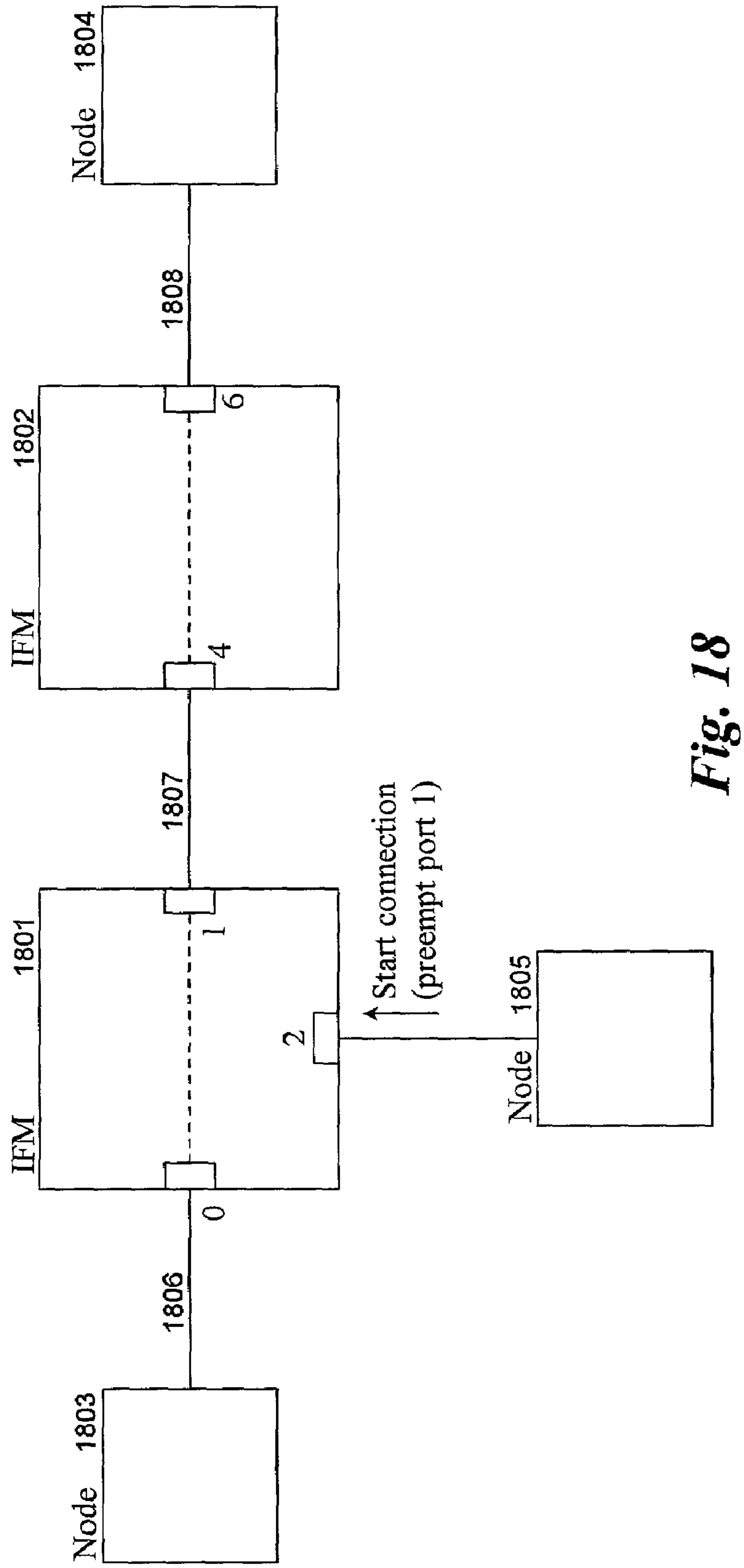
FIG. 18 illustrates the preempting of a connection.

In one embodiment, the interconnect fabric modules allow an existing connection to be preempted when a connection with a higher priority is to be established that conflicts with the existing connection. FIG. 18 illustrates the preempting of a connection. A connection is established between node 1803 and node 1804. The connection includes link 1806, a crosspoint connection between port 0 and port 1 of interconnect fabric module 1801, link 1807, a crosspoint connection between port 4 and port 6 of interconnect fabric module 1802, and link 1808. Once the connection has been established, node 1805 may send a start-of-connection frame with a higher priority than the existing connection and with its preemption bit (flag) set. When the switch protocol controller for port 2 receives the frame, it selects the switch destination port through which the connection is to be built. The switch protocol controller may use the equivalent port service to identify an equivalent port that is available if the port designated by the port map is in use. If port 1 is designated in the port map and there is no equivalent port that is available, the switch protocol controller for port 2 detects a conflict. The switch protocol controller then sets a flag indicating that the conflicting port (i.e., ports 0 or 1) should participate in the ensuing arbitration. The switch protocol controller for port 2 then sets the arbitration flag and the conflicting port and port 2 participate in the arbitration. If the conflicting port loses, its switch protocol controller sends a frame through its connection in both directions indicating that the connection is to be removed and the switch protocol controller for port 2 establishes a crosspoint connection between port 1 and port 2 and transmits its start-of-connection frame. Conversely, if the conflicting port wins the arbitration, then the connection is left established and the switch protocol controller for port 2 sends a frame indicating that the connection cannot be established in its input direction.

Figure 19:
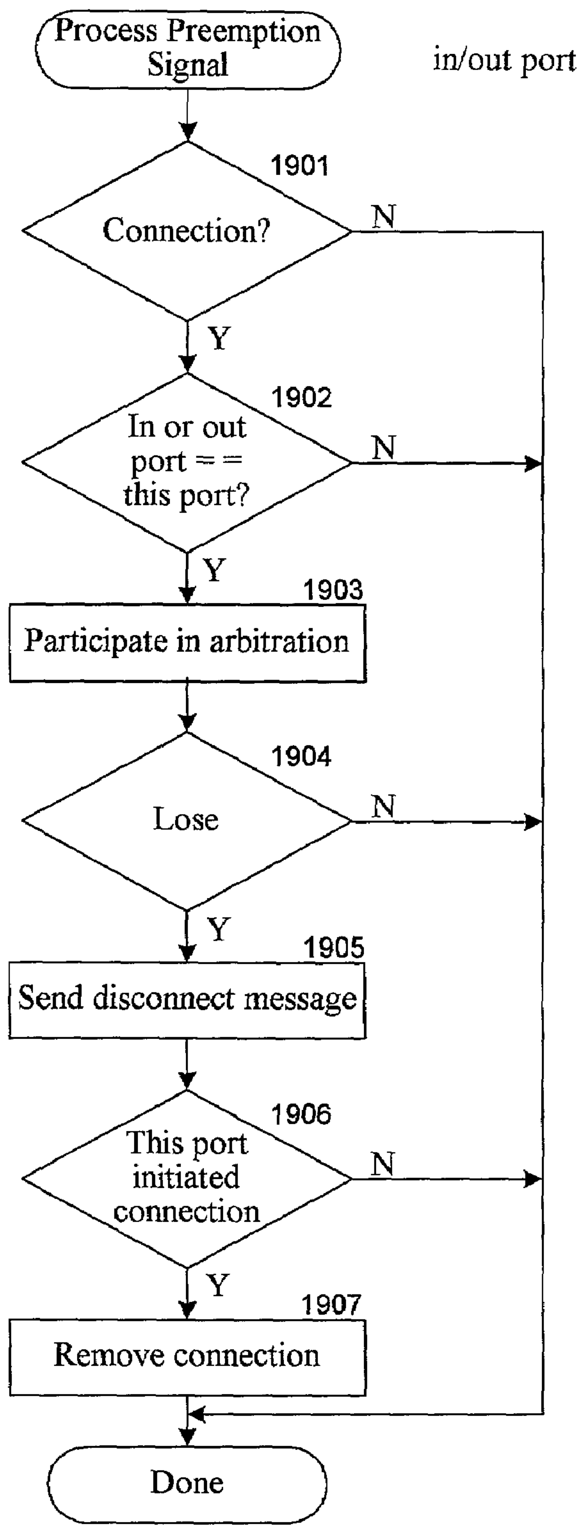
FIG. 19 is a diagram illustrating the logic of processing a preemption signal in one embodiment.

FIG. 19 is a diagram illustrating the logic of processing a preemption signal in one embodiment. This processing is performed when a switch protocol controller detects a preemption signal on the arbitration bus. In decision block 1901, if this port is currently in a connection, then the switch protocol controller may need to participate in the arbitration. In decision block 1902, if this port is the conflicting port (i.e., established the connection), then this port participates in the arbitration and continues processing at block 1903. In block 1903, the switch protocol controller for this port participates in the arbitration. In decision block 1904, if the switch protocol controller of this port loses the arbitration, then it continues at block 1905 to disconnect the connection, else it leaves the connection established. In block 1905, the switch protocol controller sends a disconnect frame in the direction of its input and output. In block 1906, the switch protocol controller indicates to the switch control unit to remove the crosspoint connection for this port.

Distributed Class 3 Multicasting

The Fibre Channel standard defines a class 3 protocol that provides a connectionless protocol for transmitting frames without an acknowledgment. Because the protocol is connectionless and no acknowledgment is used, the class 3 protocol can be used for multicasting, that is sending a frame from one node to multiple nodes. Class 3 protocol also specifies that frame delivery is not guaranteed. Traditionally, when a Fibre Channel switch receives a class 3 frame for multicasting, it routes that class 3 frame through as many of the destination ports as are currently available and then discards that frame. In one embodiment, a switch protocol controller buffers a class 3 multicasting frame and sends the frame through the multicast ports as they become available. Although the timeout of the class 3 frame at the switch protocol controller may expire before all multicast ports become available, the buffering of multicast frames increases the chances that the frame may be sent through additional multicast ports as they become available. One skilled in the art will appreciate that multiframe buffering can be used with communications services other than class 3 of Fibre Channel. In particular, it can be used with any non-acknowledged data gram service, also referred to as a packet service. One skilled in the art will appreciate that multiframe buffering can be used to interleave the transmission of a multicast frame with other frames (e.g., connectionless frames). The multiframe buffering algorithm may, for example, give a highest priority score to the multicast frame only when at least one of the multicast ports is currently available.

Figure 20:
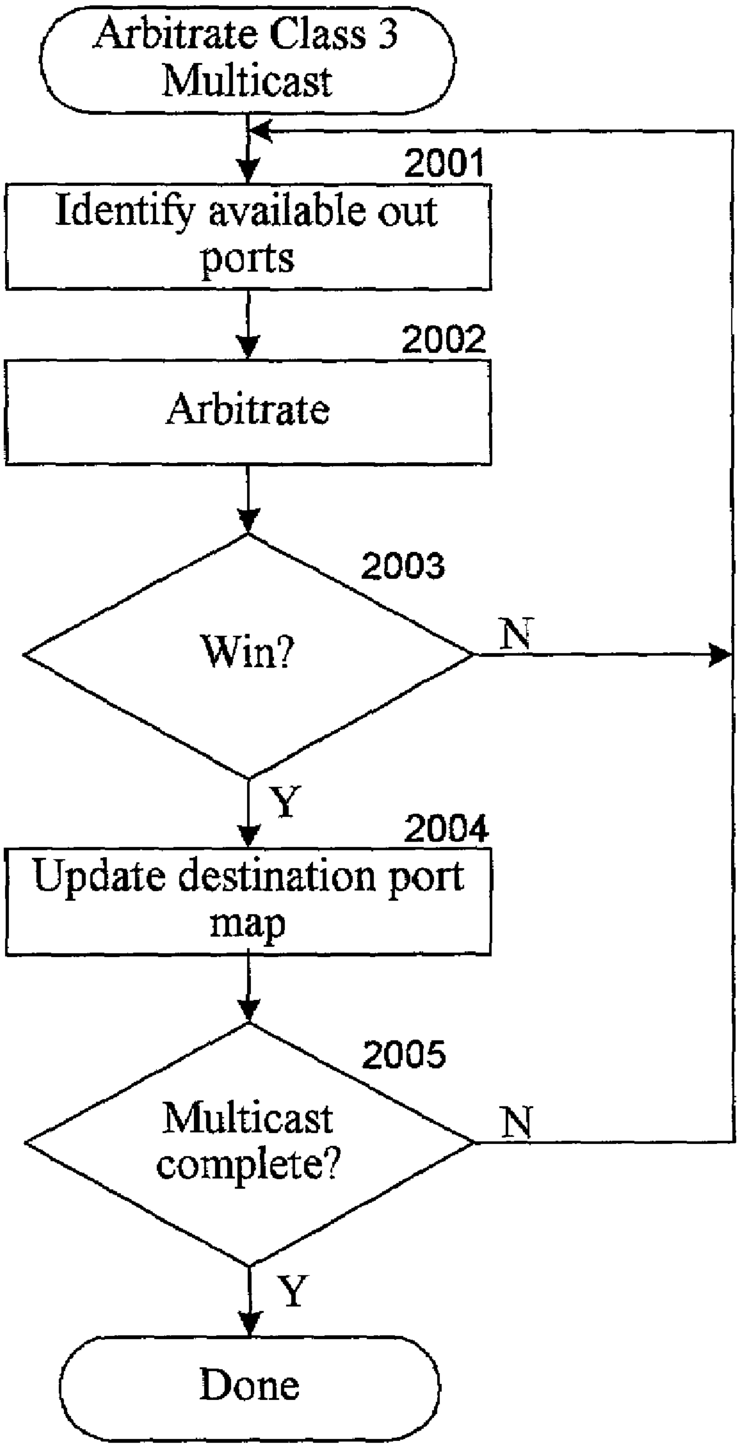
FIG. 20 is a diagram illustrating the logic of distributed class 3 multicasting in one embodiment.

FIG. 20 is a diagram illustrating the logic of distributed class 3 multicasting in one embodiment. This logic is performed when a class 3 frame with multicasting is received at a switch protocol controller. In block 2001, the switch protocol controller identifies the multicast ports that are currently available. The multicast ports may be the set of ports indicated by the port map to which a virtual address maps. In block 2002, if any of the multicast ports are available, then the switch protocol controller participates in arbitration. In decision block 2003, if the switch protocol controller wins the arbitration, then it continues at block 2004, else it continues at block 2001 to again participate in an arbitration. In block 2004, the switch protocol controller sends the frame and updates the port map stored in a temporary buffer to reflect those ports through which the frame has been sent. In decision block 2005, if the multicast is complete (i.e., the frame has been transmitted through each multicast port), then processing completes, else processing continues to participate in an arbitration to send the frame as additional ports become available.

One skilled in the art will appreciate that, although various embodiments of the technology have been described, various modifications may be made without deviating from the spirit and scope of the invention. For example, aspects of the technology may be used on many different types of routing devices (e.g., switches) other than an interconnect fabric module as described herein. Accordingly, the invention is not limited except as by the following claims.

What is claimed is:

1. A method in a switch for selecting a destination port for data, the destination port being connected by a link to a port of another switch, the method comprising:

providing a designation that a first port and second port are equivalent;

receiving data that designates that the first port is to be the destination port for the received data, wherein said destination port is assigned a virtual address for said received data; and when the first port is currently unavailable, selecting the second port as the destination port for the received data based on the provided designation that the first port and the second port are equivalent, wherein the received data designates the first port to be the destination port based on a mapping of a virtual address of the received data to the first port, further wherein the first or second port can be equivalent to multiple other ports and the multiple other ports have associated priorities and the second port is selected as the destination port when it has a priority that is higher than another of the multiple ports that are available.

2. The method of claim 1 wherein the provided designation is stored in a table with an entry for ports of the switch.

3. The method of claim 2 wherein an entry for the first port designates that the second port is equivalent to the first port.

4. The method of claim 2 wherein an entry for the second port designates that the first port is equivalent to the second port.

5. The method of claim 1 wherein the provided designations is provided by a source external to the switch.

6. The method of claim 1 wherein the provided designation is dynamically updated by a source external to the switch.

7. The method of claim 1 wherein the switch is part of an interconnect fabric.

8. The method of claim 1 wherein the switch is Fibre Channel compatible.

9. The method of claim 1 wherein the switch is InfiniBand compatible.

10. The method of claim 1 wherein the data is a Fibre Channel frame.

11. A routing device comprising:

a designation that a first port and second port are equivalent and wherein said first or second port can be equivalent to multiple other ports and wherein the multiple ports have associated priorities and the second port is selected as the destination port when it has a priority that is higher than another of the multiple ports that are available;

a component that receives a communication that designates that the first port is to be the destination port for the received communication, wherein said destination port is assigned a virtual address for said communication; and a component that selects the second port as the destination port for the received communication based on the designation when the first port is currently unavailable, wherein the communication designates the first port to be the destination port based on a mapping of a virtual address of the received communication to the first port.

12. The routing device of claim 11 wherein the designation is a table with an entry for source ports of the routing device.

13. The routing device of claim 12 wherein an entry for the first port designates that the second port is equivalent to the first port.

14. The routing device of claim 12 wherein an entry for the second port designates that the first port is equivalent to the second port.

15. The routing device of claim 11 wherein the designation is provided by a source external to the routing device.

16. The routing device of claim 11 wherein the designation is dynamically updated by a source external to the routing device.

17. The routing device of claim 11 wherein the routing device is part of an interconnect fabric.

18. The routing device of claim 11 wherein the routing device is Fibre Channel compatible.

19. The routing device of claim 11 wherein the routing device is InfiniBand compatible.

* * * * *